(12) United States Patent
Groombridge et al.

(10) Patent No.: US 11,973,220 B2
(45) Date of Patent: Apr. 30, 2024

(54) ACTIVE ELECTRODE MATERIAL

(71) Applicant: Echion Technologies Limited, Cambridge (GB)

(72) Inventors: Alexander Groombridge, Cambridge (GB); Zhihong Cai, Cambridge (GB); Daniel Martin, Cambridge (GB); Prince Babbar, Cambridge (GB)

(73) Assignee: Echion Technologies Limited, Cambridge (GB)

( * ) Notice: Subject to any disclaimer, the term of this patent is extended or adjusted under 35 U.S.C. 154(b) by 0 days.

(21) Appl. No.: 18/335,675

(22) Filed: Jun. 15, 2023

(65) Prior Publication Data

US 2023/0411613 A1 Dec. 21, 2023

Related U.S. Application Data

(63) Continuation of application No. 17/775,239, filed as application No. PCT/GB2021/052228 on Aug. 27, 2021, now Pat. No. 11,721,806.

(30) Foreign Application Priority Data

Aug. 28, 2020 (GB) ...................... 2013576
Oct. 8, 2020 (WO) ................. PCT/GB2020/052485
(Continued)

(51) Int. Cl.
*H01M 4/485* (2010.01)
*C01G 23/04* (2006.01)
(Continued)

(52) U.S. Cl.
CPC ............ *H01M 4/485* (2013.01); *C01G 23/04* (2013.01); *C01G 33/00* (2013.01); *C01G 33/006* (2013.01);
(Continued)

(58) Field of Classification Search
None
See application file for complete search history.

(56) References Cited

U.S. PATENT DOCUMENTS 4,542,083 A 9/1985 Cava et al.
6,124,057 A 9/2000 Ito et al.
(Continued)

FOREIGN PATENT DOCUMENTS

CN 102326282 A 1/2012
CN 106299329 A 1/2017
(Continued)

OTHER PUBLICATIONS

Search Report under Section 17 for Application No. GB2002487.3 dated Apr. 10, 2020.
(Continued)

*Primary Examiner* — Wyatt P McConnell
(74) *Attorney, Agent, or Firm* — Wolf, Greenfield & Sacks, P.C.

(57) ABSTRACT

The invention relates to active electrode materials and to methods for the manufacture of active electrode materials. Such materials are of interest as active electrode materials in lithium-ion or sodium-ion batteries. The invention provides an active electrode material expressed by the general formula $M1_a M2_{2-a} M3_b Nb_{34-b} O_{87-c-d} Q_d$.

24 Claims, 2 Drawing Sheets

(30) Foreign Application Priority Data

| | | |
|---|---|---|
| Oct. 8, 2020 | (WO) | PCT/GB2020/052486 |
| Oct. 8, 2020 | (WO) | PCT/GB2020/052487 |
| Mar. 30, 2021 | (GB) | 2104508 |
| Apr. 9, 2021 | (GB) | 2105091 |

(51) Int. Cl.

| | |
|---|---|
| *C01G 33/00* | (2006.01) |
| *C01G 37/14* | (2006.01) |
| *C01G 49/00* | (2006.01) |
| *H01M 4/04* | (2006.01) |
| *H01M 4/131* | (2010.01) |
| *H01M 4/36* | (2006.01) |
| *H01M 4/583* | (2010.01) |
| *H01M 4/62* | (2006.01) |
| *H01M 10/0525* | (2010.01) |
| *H01M 10/054* | (2010.01) |
| *H01M 4/02* | (2006.01) |

(52) U.S. Cl.
CPC .......... *C01G 37/14* (2013.01); *C01G 49/0063* (2013.01); *H01M 4/0471* (2013.01); *H01M 4/049* (2013.01); *H01M 4/131* (2013.01); *H01M 4/364* (2013.01); *H01M 4/366* (2013.01); *H01M 4/583* (2013.01); *H01M 4/625* (2013.01); *H01M 10/0525* (2013.01); *H01M 10/054* (2013.01); *C01P 2002/52* (2013.01); *C01P 2002/70* (2013.01); *C01P 2002/72* (2013.01); *C01P 2004/03* (2013.01); *C01P 2004/61* (2013.01); *C01P 2004/62* (2013.01); *C01P 2004/80* (2013.01); *C01P 2006/12* (2013.01); *C01P 2006/40* (2013.01); *H01M 2004/021* (2013.01); *H01M 2004/027* (2013.01)

(56) References Cited

U.S. PATENT DOCUMENTS

| | | | |
|---|---|---|---|
| 6,391,496 | B1 | 5/2002 | Nakajima et al. |
| 8,647,773 | B2 | 2/2014 | Goodenough et al. |
| 9,515,319 | B2 | 12/2016 | Harada et al. |
| 9,698,417 | B2 | 7/2017 | Buannic et al. |
| 9,806,339 | B2 | 10/2017 | Nakahara et al. |
| 10,263,243 | B2 | 4/2019 | Inoue et al. |
| 10,749,169 | B2 | 8/2020 | Harada et al. |
| 11,721,806 | B2 | 8/2023 | Groombridge et al. |
| 2011/0206991 | A1 | 8/2011 | Nakahara et al. |
| 2012/0052401 | A1 | 3/2012 | Goodenough et al. |
| 2015/0010820 | A1 | 1/2015 | Takami et al. |
| 2015/0086872 | A1 | 3/2015 | Ise et al. |
| 2015/0270543 | A1 | 9/2015 | Harada et al. |
| 2016/0087275 | A1 | 3/2016 | Zhang et al. |
| 2016/0268602 | A1 | 9/2016 | Inagaki et al. |
| 2017/0040643 | A1 | 2/2017 | Dolle et al. |
| 2017/0077509 | A1 | 3/2017 | Ise et al. |
| 2018/0083283 | A1 | 3/2018 | Yamashita et al. |
| 2018/0219221 | A1 | 8/2018 | Yamauchi |
| 2018/0277835 | A1 | 9/2018 | Ise et al. |
| 2018/0277907 | A1 | 9/2018 | Iwasaki et al. |
| 2019/0044179 | A1 | 2/2019 | Sugimori et al. |
| 2019/0088941 | A1 | 3/2019 | Harada et al. |
| 2019/0252131 | A1 | 8/2019 | Zhamu et al. |
| 2019/0280291 | A1 | 9/2019 | Pan et al. |
| 2019/0288283 | A1 | 9/2019 | Harada et al. |
| 2020/0091502 | A1 | 3/2020 | Harada et al. |
| 2020/0091513 | A1 | 3/2020 | Harada et al. |
| 2020/0112018 | A1* | 4/2020 | Zhang ............... H01M 10/0565 |
| 2020/0136148 | A1 | 4/2020 | Ma et al. |
| 2020/0140339 | A1 | 5/2020 | Ko et al. |
| 2020/0152963 | A1 | 5/2020 | Zhang et al. |
| 2020/0176756 | A1 | 6/2020 | Fukushima et al. |
| 2020/0235384 | A1 | 7/2020 | Yoshioka et al. |
| 2022/0380226 | A1 | 12/2022 | Groombridge et al. |
| 2022/0384797 | A1 | 12/2022 | Groombridge et al. |
| 2022/0384798 | A1 | 12/2022 | Groombridge et al. |
| 2023/0178719 | A1 | 6/2023 | Groombridge et al. |
| 2023/0197942 | A1 | 6/2023 | Groombridge et al. |
| 2023/0231123 | A1 | 7/2023 | Groombridge et al. |

FOREIGN PATENT DOCUMENTS

| | | |
|---|---|---|
| CN | 106532109 A | 3/2017 |
| CN | 107742716 A | 2/2018 |
| CN | 108807963 A | 11/2018 |
| CN | 109167049 A | 1/2019 |
| CN | 109244443 A | 1/2019 |
| CN | 109360978 A | 2/2019 |
| CN | 109904441 A | 6/2019 |
| CN | 110137481 A | 8/2019 |
| CN | 107742716 B | 4/2020 |
| DE | 69707637 T2 | 8/2002 |
| EP | 0 853 347 A1 | 7/1998 |
| EP | 2 361 888 A2 | 8/2011 |
| EP | 2 503 625 A3 | 7/2015 |
| EP | 2 975 679 A1 | 1/2016 |
| EP | 2 980 891 A1 | 2/2016 |
| EP | 3 070 767 A1 | 6/2016 |
| EP | 3 121 878 A1 | 1/2017 |
| EP | 3 220 454 B1 | 9/2019 |
| EP | 3 539 927 A1 | 9/2019 |
| EP | 4 230 586 A1 | 8/2023 |
| GB | 2588254 A | 4/2021 |
| GB | 2588264 A | 4/2021 |
| GB | 2595745 A | 12/2021 |
| GB | 2598432 A | 3/2022 |
| GB | 2598438 A | 3/2022 |
| JP | H09-253495 A | 9/1997 |
| JP | H10-233208 A | 9/1998 |
| JP | H10-255796 A | 9/1998 |
| JP | 3390327 B2 | 3/2003 |
| JP | 3426901 B2 | 7/2003 |
| JP | 5694411 B2 | 4/2015 |
| JP | 2016-054051 A | 4/2016 |
| JP | 6200533 B2 | 9/2017 |
| KR | 20150131800 A | 11/2015 |
| WO | WO 2015/045254 A1 | 4/2015 |
| WO | WO 2015/138019 A1 | 9/2015 |
| WO | WO 2019/234248 A1 | 12/2019 |
| WO | WO 2019/243614 A1 | 12/2019 |
| WO | WO 2020/073915 A1 | 4/2020 |
| WO | WO 2020/098427 A1 | 5/2020 |
| WO | WO 2019/093404 A1 | 7/2020 |
| WO | WO 2021/074406 A1 | 4/2021 |
| WO | WO 2021/074592 A1 | 4/2021 |
| WO | WO 2021/074593 A1 | 4/2021 |
| WO | WO 2021/074594 A1 | 4/2021 |
| WO | WO 2021/245410 A1 | 12/2021 |

OTHER PUBLICATIONS

Further Search Report under Section 17 for Application No. GB2002487.3 dated May 13, 2020.
Search Report under Section 17 for Application No. GB2008352.3 dated Jul. 9, 2020.
Search Report under Section 17 for Application No. GB2011681.0 dated Sep. 8, 2020.
Search Report under Section 17 for Application No. GB2013576.0 dated Oct. 20, 2020.
Search Report under Section 17 for Application No. GB2104508.3 dated Sep. 10, 2021.
Search Report under Section 17 for Application No. GB2104713.9 dated May 26, 2021.
Search Report under Section 17 for Application No. GB2105082.8 dated Jun. 1, 2021.
Examination Report under Section 18(3) for GB Application No. GB2105082.8 dated Aug. 5, 2021.
Search Report under Section 17 for Application No. GB2105091.9 dated May 27, 2021.

(56) References Cited

OTHER PUBLICATIONS

International Search Report for International Application No. PCT/GB2020/052485 dated Mar. 12, 2021.
International Search Report for International Application No. PCT/GB2020/052486 dated Jan. 18, 2021.
International Search Report for International Application No. PCT/GB2020/052487 dated Mar. 12, 2021.
International Search Report and Written Opinion for International Application No. PCT/GB2021/051357 dated Aug. 9, 2021.
International Search Report and Written Opinion for International Application No. PCT/GB2021/051358 dated Aug. 9, 2021.
International Search Report for International Application No. PCT/GB2021/052228 dated Nov. 17, 2021.
Amonpattarakit et al., X-Ray Diffraction and Zn K-Edge XANES Studies of Perovskite Ferroelectric PZT-PZN Powders Derived from $Zn2Nb34O87$ Precursor. Ferroelectrics. Feb. 17, 2016;492:25-34.
Benabbas et al., Redetermination of the structure of $PNb9O25$. Acta Cryst. Apr. 1991;47(4):849-50.
Bergner et al., $VNb9O25$—δ—Synthesis, electrical conducting behaviour and density functional theory (DFT) calculation. J Solid State Chem. Aug. 2009;182(8):2053-60.
Bini et al., The Doping of $FeNb11O29$ as a Way to Improve Its Electrochemical Performances. ChemistrySelect. May 21, 2019;4(19):5656-61.
Cava et al., Lithium Insertion in Wadsley-Roth Phases Based on Niobium Oxide. J Electrochem Soc. Jan. 1, 1983;130(12):2345-51.
Cava et al., Lithium insertion, electrical conductivity, and chemical substitution in various crystallographic shear structures. Solid State Ionics. Dec. 1983;9-10(Part 1):407-11.
Drozhzhin et al., Li-ion diffusion in $LixNb9PO25$. Electrochim Acta. Feb. 1, 2013;89:262-9.
Fu et al., Design, synthesis and lithium-ion storage capability of $A10.5Nb24.5O62$. J Mater Chem A. Aug. 13, 2019;7(34):19862-71.
Fu et al., Highly conductive $CrNb11O29$ nanorods for use in high-energy, safe, fast-charging and stable lithium-ion batteries. J Power Sources. Sep. 1, 2018;397:231-9.
Glaum et al., Resource-Efficient Alkane Selective Oxidation on New Crystalline Solids: Searching for Novel Catalyst Materials. Special Issue: Innovative Technologien fur Ressourceneffizienz. Oct. 2012;84(10):1766-79.
Goodenough et al., The Li-ion rechargeable battery: a perspective. J Am Chem Soc. Jan. 30, 2013;135(4):1167-76. doi: 10.1021/ja3091438. Epub Jan. 18, 2013.
Griffith et al., High-Rate Intercalation without Nanostructuring in Metastable $Nb2O5$ Bronze Phases. J Am Chem Soc. Jul. 20, 2016;138(28):8888-99. doi: 10.1021/jacs.6b04345. Epub Jul. 10, 2016.
Griffith et al., Niobium tungsten oxides for high-rate lithium-ion energy storage. Nature. Jul. 2018;559(7715):556-563. doi: 10.1038/s41586-018-0347-0. Epub Jul. 25, 2018.
Griffith et al., Structural Stability from Crystallographic Shear in $TiO2$—$Nb2O5$ Phases: Cation Ordering and Lithiation Behavior of $TiNb24O62$. Inorg Chem. Mar. 20, 2017;56(7):4002-10.
Griffith et al., Titanium Niobium Oxide: From Discovery to Application in Fast-Charging Lithium-Ion Batteries. Chem Mater. Dec. 17, 2020;33(1):4-18.
Jayaprakash et al., A new class of tailor-made $Fe0.92Mn0.08Si2$ lithium battery anodes: Effect of composite and carbon coated $Fe0.92Mn0.08Si2$ anodes. Intermetallics. Mar. 2007:15(3):442-50.
Ji et al., Carbon-emcoating architecture boosts lithium storage of $Nb2O5$. Science China Materials. Dec. 24, 2020;64(5):1071-86.
Koçer et al., Cation Disorder and Lithium Insertion Mechanism of Wadsley-Roth Crystallographic Shear Phases from First Principles. J Am Chem Soc. Sep. 25, 2019;141(38):15121-15134. doi: 10.1021/jacs.9b06316. Epub Sep. 12, 2019.
Li et al., Electrochemical Lithium Intercalation in Monoclinic $Nb12O29$. Chem Mater. Apr. 14, 2011;23(9):2292-4.
Li et al., High-performance fuel electrodes based on $NbTi0.5M0.5O4$ (M = Ni, Cu) with reversible exsolution of the nano-catalyst for steam electrolysis. J Mater Chem A. May 2013;1(31):8984-93.
Li et al., Novel $GaNb49O124$ microspheres with intercalation pseudocapacitance for ultrastable lithium-ion storage. Ceramics International. Jun. 15, 2019;45(9):12211-7.
Lou et al., Crystal Structure Modification Enhanced $FeNb11O29$ Anodes for Lithium-Ion Batteries. ChemElectroChem. Dec. 2017;4(12):3171-80. Accepted Article.
Lou et al., Exploration of $Cr0.2Fe0.8Nb11O29$ as an advanced anode material for lithium-ion batteries of electric vehicles. Electrochim Acta. Aug. 10, 2017;245:482-8.
Lou et al., $GaNb11O29$ Nanowebs as High-Performance Anode Materials for Lithium-Ion Batteries. ACS Appl Nano Mater. Dec. 21, 2017;1(1):183-90.
Lou et al., Nb-Based Oxides as Anode Materials for Lithium Ion Batteries. Progress in Chemistry. Mar. 2015;27(2/3):297-309.
Lou et al., New Anode Material for Lithium-Ion Batteries: Aluminum Niobate ($AlNb11O29$). ACS Appl Mater Interfaces. Feb. 13, 2019;11(6):6089-6096. doi: 10.1021/acsami.8b20246. Epub Feb. 4, 2019. Supporting Information.
Lu et al., Investigation of Physical and Electrochemical Properties of β-$TaxNb1-xPO5$ as an Electrode Material for Lithium Batteries. Chem Mater. Apr. 15, 2016;28(9):2949-61.
Montemayor et al., Lithium insertion in two tetragonal tungsten bronze type phases, $M8W9O47$ (M=Nb and Ta). J Mater Chem. 1998;8(12):2777-81.
Morcrette et al., In situ X-ray diffraction techniques as a powerful tool to study battery electrode materials. Electrochim Acta. Jul. 27, 2002;47(19):3137-49.
Patoux et al., A Reversible Lithium Intercalation Process in an $ReO3$ Type Structure $PNb9O25$. J Electrochem Soc. Feb. 19, 2002;149(4):A391-400.
Preefer et al., Multielectron Redox and Insulator-to-Metal Transition upon Lithium Insertion in the Fast-Charging, Wadsley-Roth Phase $PNb9O25$. Chem Mater. May 13, 2020;32(11):4553-63.
Qian et al., High-Rate Long-Life Pored Nanoribbon $VNb9O25$ Built by Interconnected Ultrafine Nanoparticles as Anode for Lithium-Ion Batteries. ACS Appl Mater Interfaces. Sep. 13, 2017;9(36):30608-30616. doi: 10.1021/acsami.7b07460. Epub Sep. 1, 2017.
Roth et al., The crystal structure of $PNbO25$ ($P2O5.9Nb2O5$). Acta Cryst. Apr. 1965;18(4):643-7.
Saritha et al., Electrochemical Li insertion studies on $WNb12O33$—A shear $ReO3$ type structure. J Solid State Chem. May 2010;183(5):988-93.
Saritha, Electrochemical analysis of tungsten bronze-type phases, $W9Nb8O47$ and $W7Nb4O31$, synthesised by sol-gel method. Mater Sci Eng B. Feb. 2018;228:218-23.
Shannon, Revised effective ionic radii and systematic studies of interatomic distances in halides and chalcogenides. Acta Cryst. 1976;A32:751-67.
Solis et al., Adjusting the conduction properties of $La0.995Ca0.005NbO4$—δby doping for proton conducting fuel cells electrode operation. Solid State Ionics. May 19, 2011;190(1):38-45.
Song et al., Mo-doped $TiNb2O7$ anode for lithium-ion batteries with high rate capability due to charge redistribution. Chem Commun (Camb). Jun. 18, 2015;51(48):9849-52. doi: 10.1039/c5cc02221e. Author manuscript provided. 5 pages.
Spada et al., Deepening the shear structure $FeNb11O29$: influence of polymorphism and doping on structural, spectroscopic and magnetic properties. Dalton Trans. Nov. 13, 2018;47(44):15816-15826. doi: 10.1039/c8dt02896f.
Stephenson, A structural investigation of some stable phases in the region $Nb2O5.WO3$-$WO3$. Acta Cryst Section B. Jan. 1, 1968;B24:637-53.
Tabero, Thermal expansion of phases formed in the system $Nb2O5$—$MoO3$. J Therm Anal Calorim. Nov. 2003;74(2):491-6.
Takashima et al., Characterization of mixed titanium-niobium oxide $Ti2Nb10O29$ annealed in vacuum as anode material for lithium-ion battery. J Power Sources. Feb. 15, 2015;276:113-9.
Tomaszewska et al., Lithium-ion battery fast charging: A review. eTransportation. Aug. 2019;1:100011.

(56) References Cited

OTHER PUBLICATIONS

Wu et al., Rational synthesis of Cr0.5Nb24.5O62 microspheres as high-rate electrodes for lithium ion batteries. J Colloid Interface Sci. Mar. 7, 2020;562:511-517. doi: 10.1016/j.jcis.2019.11.085. Epub Nov. 21, 2019.

Xiao et al., The positive effect of nitridation on CrNb49O124 nanowires for high-performance lithium-ion storage. Ceramics International. Jul. 2020;46(10):15527-33.

Xu et al., Synthesis, structure, and physical properties of niobium phosphate bronze (Nb18P2.5O50). Inorg Chem. Jan. 1, 1994;33(2):267-70.

Yan et al., Electrospun WNb12O33 nanowires: superior lithium storage capability and their working mechanism. J Mater Chem A. Apr. 10, 2017;5(19):8972-80.

Yang et al., Conductive Copper Niobate: Superior Li+-Storage Capability and Novel Li+-Transport Mechanism. Adv Energ Mater. Oct. 17, 2019;9(39):1902174.

Yang et al., Cr0.5Nb24.5O62 Nanowires with High Electronic Conductivity for High-Rate and Long-Life Lithium-Ion Storage. ACS Nano. Apr. 25, 2017;11(4):4217-4224. doi: 10.1021/acsnano.7b01163. Epub Apr. 3, 2017.

Yang et al., Porous ZrNb24O62 nanowires with pseudocapacitive behavior achieve high-performance lithium-ion storage. J Mater Chem A. Sep. 25, 2017;5(42):22297-304.

Yang et al., Wadsley-Roth Crystallographic Shear Structure Niobium-Based Oxides: Promising Anode Materials for High-Safety Lithium-Ion Batteries. Adv Sci (Weinh). Jun. 2021;8(12):e2004855. doi: 10.1002/advs.202004855. Epub Mar. 15, 2021.

Ye et al., Constructing Hollow Nanofibers To Boost Electrochemical Performance: Insight into Kinetics and the Li Storage Mechanism for CrNb49O124. ACS Appl Energy Mater. Mar. 12, 2019;2(4):2672-9.

Ye et al., Highly efficient lithium container based on non-Wadsley-Roth structure Nb18W16O93 nanowires for electrochemical energy storage. Electrochim Acta. Dec. 1, 2018;292:331-8. Author manuscript provided. 39 pages.

Yu et al., PNb9O25 nanofiber as a high-voltage anode material for advanced lithium ions batteries. J Materiomics. Dec. 2020;6(4):781-7. Journal Pre-proof.

Yu et al., The journey of lithium ions in the lattice of PNb9O25. Mater Chem Front. Dec. 20, 2019;4(2):631-7.

Yuan et al., Recent Advances in Titanium Niobium Oxide Anodes for High-Power Lithium-Ion Batteries. Energy Fuels. Sep. 21, 2020;34(11):13321-34. Author manuscript provided. 50 pages.

Zhai et al., Oxygen vacancy boosted the electrochemistry performance of Ti4+ doped Nb2O5 toward lithium ion battery. Appl Surf Sci. Jan. 1, 2020;499:143905.

Zheng et al., Rational construction and decoration of Fe0.5Nb24.5O62-x@C nanowires as superior anode material for lithium storage. Chem Eng J. Mar. 15, 2020;384:123314.

Zhou et al., Facile spray drying route for the Three-Dimensional Graphene-encapsulated Fe2O3 Nanoparticles for Lithium Ion Battery Anodes. Ind Eng Chem Res. 2013;52:1197-204.

Zhu et al., An inverse opal Cu2Nb34O87 anode for high-performance Li+ storage. Chem Commun (Camb). Jul. 7, 2020;56(53):7321-7324. doi: 10.1039/d0cc02016h. Epub Jun. 1, 2020. Author manuscript provided. 5 pages.

Zhu et al., Mg2Nb34O87 Porous Microspheres for Use in High-Energy, Safe, Fast-Charging, and Stable Lithium-Ion Batteries. ACS Appl Mater Interfaces. Jul. 18, 2018;10(28):23711-23720. doi: 10.1021/acsami.8b03997. Epub Jul. 5, 2018.

Zhu et al., MoNb12O33 as a new anode material for high-capacity, safe, rapid and durable Li+ storage: structural characteristics, electrochemical properties and working mechanisms. J Mater Chem A. Mar. 2019;7(11):6522-32.

Zhu et al., Zinc niobate materials: crystal structures, energy-storage capabilities and working mechanisms. J Mater Chem A. Oct. 31, 2019;7(44):25537-47.

\* cited by examiner

ACTIVE ELECTRODE MATERIAL

RELATED APPLICATIONS

This Application is a Continuation Application of U.S. application Ser. No. 17/775,239, filed May 6, 2022, entitled "ACTIVE ELECTRODE MATERIAL", which is a national stage filing under 35 U.S.C. § 371 of International Patent Application Serial No. PCT/GB2021/052228, filed Aug. 27, 2021, entitled "ACTIVE ELECTRODE MATERIAL", which claims priority to GB application number 2013576.0, filed Aug. 28, 2020; International Patent Application Serial No. PCT/GB2020/052487, filed Oct. 8, 2020; International Patent Application Serial No. PCT/GB2020/052485, filed Oct. 8, 2020; International Patent Application Serial No. PCT/GB2020/052486, filed Oct. 8, 2020; GB application number 2104508.3, filed Mar. 30, 2021; and GB application number 2105091.9, filed Apr. 9, 2021, each of which is herein incorporated by reference in their entireties.

FIELD OF THE INVENTION

The present invention relates to active electrode materials and to methods for the manufacture of active electrode materials. Such materials are of interest as active electrode materials in lithium-ion or sodium-ion batteries, for example as anode materials for lithium-ion batteries.

BACKGROUND

Lithium-ion (Li-ion) batteries are a commonly used type of rechargeable battery with a global market predicted to grow to $200 bn by 2030. Li-ion batteries are the technology of choice for electric vehicles that have multiple demands across technical performance to environmental impact, providing a viable pathway for a green automotive industry.

A typical lithium-ion battery is composed of multiple cells connected in series or in parallel. Each individual cell is usually composed of an anode (negative polarity electrode) and a cathode (positive polarity electrode), separated by a porous, electrically insulating membrane (called a separator), immersed into a liquid (called an electrolyte) enabling lithium ions transport.

In most systems, the electrodes are composed of an electrochemically active material—meaning that it is able to chemically react with lithium ions to store and release them reversibly in a controlled manner-mixed if necessary with an electrically conductive additive (such as carbon) and a polymeric binder. A slurry of these components is coated as a thin film on a current collector (typically a thin foil of copper or aluminium), thus forming the electrode upon drying.

In the known Li-ion battery technology, the safety limitations of graphite anodes upon battery charging is a serious impediment to its application in high-power electronics, automotive and industry. Among a wide range of potential alternatives proposed recently, lithium titanate (LTO) and mixed niobium oxides are the main contenders to replace graphite as the active material of choice for high power, fast-charge applications.

Batteries relying on a graphitic anode are fundamentally limited in terms of charging rate. Under nominal conditions, lithium ions are inserted into the anode active material upon charging. When charging rate increases, typical graphite voltage profiles are such that there is a high risk that overpotentials lead to the potential of sites on the anode to become <0 V vs. Li/Li+, which leads to a phenomenon called lithium dendrite electroplating, whereby lithium ions instead deposit at the surface of the graphite electrode as lithium metal. This leads to irreversible loss of active lithium and hence rapid capacity fade of the cell. In some cases, these dendritic deposits can grow to such large sizes that they pierce the battery separator and lead to a short-circuit of the cell. This can trigger a catastrophic failure of the cell leading to a fire or an explosion. Accordingly, the fastest-charging batteries having graphitic anodes are limited to charging rates of 5-7 C, but often much less.

Lithium titanate (LTO) anodes do not suffer from dendrite electroplating at high charging rate thanks to their high potential (1.6 V vs. Li/Li+), and have excellent cycle life as they do not suffer from significant volume expansion of the active material upon intercalation of Li ions due to their accommodating 3D crystal structure. LTO cells are typically regarded as high safety cells for these two reasons. However, LTO is a relatively poor electronic and ionic conductor, which leads to limited capacity retention at high rate and resultant power performance, unless the material is nano-sized to increase specific surface area, and carbon-coated to increase electronic conductivity. This particle-level material engineering increases the porosity and specific surface area of the active material, and results in a significantly lower achievable packing density in an electrode. This is significant because it leads to low density electrodes and a higher fraction of electrochemically inactive material (e.g. binder, carbon additive), resulting in much lower gravimetric and volumetric energy densities.

A key measure of anode performance is the electrode volumetric capacity (mAh/cm$^3$), that is, the amount of electric charges (that is lithium ions) that can be stored per unit volume of the anode. This is an important factor to determine the overall battery energy density on a volumetric basis (WVh/L) when combined with the cathode and appropriate cell design parameters. Electrode volumetric capacity can be approximated as the product of electrode density (g/cm$^3$), active material specific capacity (mAh/g), and fraction of active material in the electrode. LTO anodes typically have relatively low specific capacities (c. 165 mAh/g, to be compared with c. 330 mAh/g for graphite) which, combined with their low electrode densities (typically <2.0 g/cm$^3$) and low active material fractions (<90%) discussed above, lead to very low volumetric capacities (<300 mAh/cm$^3$) and therefore low battery energy density and high $/kWh cost in various applications. As a result, LTO batteries/cells are generally limited to specific niche applications, despite their long cycle life, fast-charging capability, and high safety.

Mixed niobium oxide structures have been of recent interest for use in Li-ion cells. Zhu et al., J. Mater. Chem. A, 2019, 7, 25537 and Zhu et al., Chem. Commun., 2020, 56, 7321-7324 disclose $Zn_2Nb_{34}O_{87}$ and $Cu_2Nb_{34}O_{87}$ as possible active electrode materials. These papers rely on complex particle-level engineering to purportedly achieve good properties, e.g. attempting to control particle porosity and morphology. It is believed that the properties of these materials can be improved. For example, these materials may not have sufficient electronic conductivity enough to allow for efficient charging and discharging in Li-ion cells for commercial use, resulting in excess impedance. In addition, improvements can still be made in Li ion capacity, coulombic efficiency, and in tuning the voltage profile of charge and discharge. Making these improvements as described herein without the need for extensive nanoscale or particle-level engineering, and without coatings, is an important step to low-cost battery materials for mass market uptakes. If these improvements are not addressed, then there is excess electrical resistance in a resultant device and lower energy densities, leading to increased polarisation, reduced power densities, lower energy efficiencies, and increased cost. Accordingly, there remains a need to improve the properties of $Zn_2Nb_{34}O_{87}$ and $Cu_2Nb_{34}O_{87}$ for use in lithium-ion batteries.

SUMMARY OF THE INVENTION

In a first aspect, the invention provides an active electrode material comprising a mixed niobium oxide, wherein the mixed niobium oxide has the composition $M1_aM2_{2-a}M3_bNb_{34-b}O_{87-c-d}Q_d$, wherein:
M1 and M2 are different;
M1 is selected from Mg, Ca, Sr, Y, La, Ce, Ti, Zr, Hf, V, Nb, Ta, Cr, Mo, W, Mn, Fe, Co, Ni, Cu, Zn, Cd, B, Al, Ga, In, Si, Ge, Sn, Pb, P, Sb, Bi and mixtures thereof;
M2 is Zn or Cu;
M3 is selected from Mg, Ca, Sr, Y, La, Ce, Ti, Zr, Hf, V, Ta, Cr, Mo, W, Mn, Fe, Co, Ni, Cu, Zn, Cd, B, Al, Ga, In, Si, Ge, Sn, Pb, P, Sb, Bi, and mixtures thereof;
Q is selected from F, Cl, Br, I, N, S, Se, and mixtures thereof;
$0 \leq a \leq 1.0$; $0 \leq b \leq 3.4$; $-0.5 \leq c \leq 4.35$; $0 \leq d \leq 4.35$;
one or more of a, b, c, and d does not equal 0; and
when a, b, and d equal zero, c is greater than zero.

It will be understood that the composition of the mixed niobium oxide does not correspond to stoichiometric $Zn_2Nb_{34}O_{87}$ or $Cu_2Nb_{34}O_{87}$. The present inventors have found that by modifying $Zn_2Nb_{34}O_{87}$ or $Cu_2Nb_{34}O_{87}$ by either incorporating further cations (M1 and/or M3), and/or by creating an induced oxygen deficiency or excess, and/or by forming mixed anion materials (comprising O and Q), the resulting material has improved electrochemical properties, and in particular improved electrochemical properties when used as an anode material. When a>0, the mixed niobium oxide is modified by partial substitution of M2 (Zn or Cu) by M1. When b>0 the mixed niobium oxide is modified by partial substitution of Nb by M3. When c≠0, the mixed niobium oxide is modified by oxygen deficiency or excess. When d>0 the mixed niobium oxide is modified by partial substitution of O by Q. The inventors have found that materials according to the invention have improved electronic conductivity, and improved coulombic efficiency, and improved de-lithiation voltage at high C-rates, compared to unmodified 'base' $Zn_2Nb_{34}O_{37}$, as shown by the present examples. These are important results in demonstrating the advantages of the material of the invention for use in high-power batteries designed for fast charge/discharge.

The active electrode material of the invention is particularly useful in electrodes, preferably for use in anodes for lithium-ion or sodium-ion batteries. Therefore, in a further implementation of the invention the active electrode material of the first aspect comprises the mixed niobium oxide and at least one other component; optionally wherein the at least one other component is selected from a binder, a solvent, a conductive additive, a different active electrode material, and mixtures thereof. Such a composition is useful for fabricating an electrode. A further implementation of the invention is an electrode comprising the active electrode material of the first aspect in electrical contact with a current collector. A further implementation of the invention is an electrochemical device comprising an anode, a cathode, and an electrolyte disposed between the anode and the cathode, wherein the anode comprises an active electrode material according to the first aspect; optionally wherein the electrochemical device is a lithium-ion battery or a sodium-ion battery.

In a second aspect, the invention provides a method of making a mixed niobium oxide as defined by the first aspect, the method comprising steps of: providing one or more precursor materials; mixing said precursor materials to form a precursor material mixture; and heat treating the precursor material mixture in a temperature range from 400° C.-1350° C. or 800-1350° C., thereby providing the mixed niobium oxide. This represents a convenient and efficient method of making the active electrode material of the first aspect.

The invention includes the combination of the aspects and features described herein except where such a combination is clearly impermissible or expressly avoided.

SUMMARY OF THE FIGURES

The principles of the invention will now be discussed with reference to the accompanying figures.

DETAILED DESCRIPTION OF THE INVENTION

Figure 1:
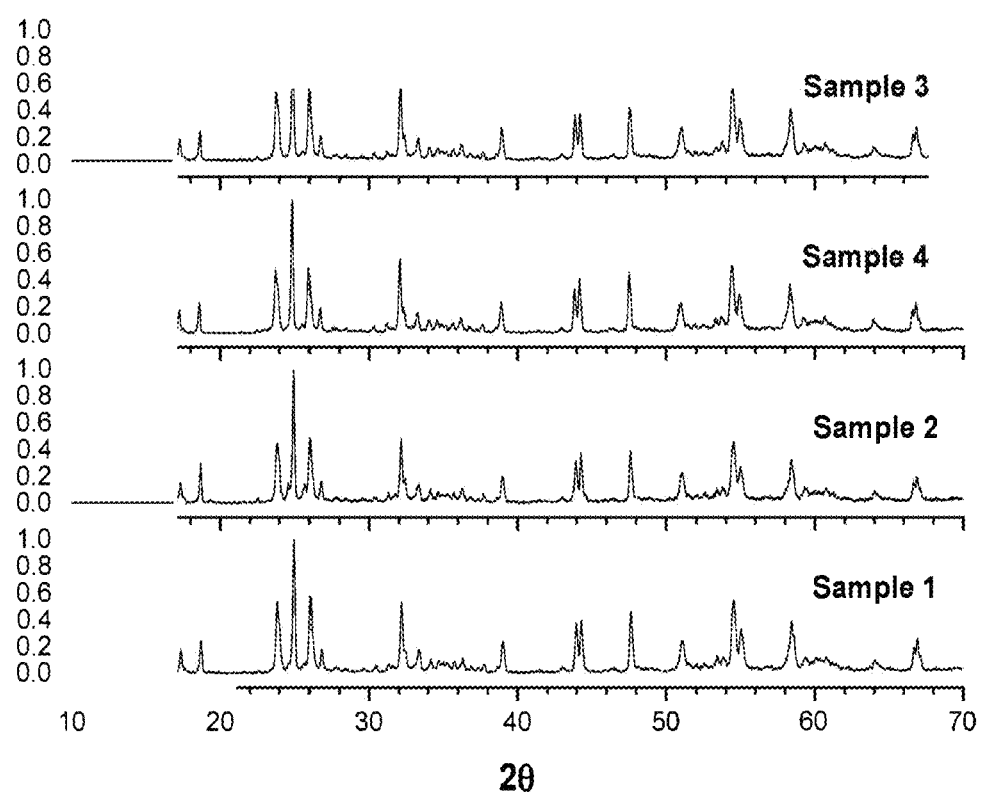
FIG. 1: Powder XRD of Samples 1-4

Aspects and embodiments of the present invention will now be discussed with reference to the accompanying figures. Further aspects and embodiments will be apparent to those skilled in the art. All documents mentioned in this text are incorporated herein by reference.

The term "mixed niobium oxide" (MNO) may refer to an oxide comprising niobium and at least one other cation. MNO materials have a high redox voltage vs. Lithium>0.8V, enabling safe and long lifetime operation, crucial for fast charging battery cells. Moreover, niobium cations can have two redox reactions per atom, resulting in higher theoretical capacities than, for example, LTO. The mixed niobium oxide described herein is derived from the base structure of $Zn_2Nb_{34}O_{87}$ or $Cu_2Nb_{34}O_{87}$.

$Zn_2Nb_{34}O_{87}$ or $Cu_2Nb_{34}O_{87}$ may be considered to have a $ReO_3$-derived $MO_{3-x}$ crystal structure. Preferably, the mixed niobium oxide has a Wadsley-Roth crystal structure. Wadsley-Roth crystal structures are considered to be a crystallographic off-stoichiometry of the $MO_3$ ($ReO_3$) crystal structure containing crystallographic shear, with simplified formula of $MO_{3-x}$. As a result, these structures typically contain $[MO_6]$ octahedral subunits in their crystal structure. The MNO materials with these structures are believed to have advantageous properties for use as active electrode materials, e.g. in lithium-ion batteries.

The open tunnel-like $MO_3$ crystal structure of MNO materials also makes them ideal candidates for having high capacity for Li ion storage and high rate intercalation/de-intercalation. The crystallographic off-stoichiometry present in the MNO structure causes the Wadsley-Roth crystallographic superstructure. These superstructures, compounded by other qualities such as the Jahn-Teller effect and enhanced crystallographic disorder by making use of multiple mixed cations, stabilise the crystal and keep the tunnels open and stable during intercalation, enabling extremely high rate performance due to high Li-ion diffusion rates (reported as $\sim 10^{-13}$ $cm^2$ $s^{-1}$).

The crystal formulae of $Zn_2Nb_{34}O_{87}$ or $Cu_2Nb_{34}O_{87}$ can be described as having a 3×4×∞ crystallographic block structure composed of $[MO_6]$ octahedra, where M is Cu, Zn, or Nb. The Cu and Zn octahedra may be randomly distributed in the structure or may have a preference for particular sites such as at the edge, or corner of the blocks. This equates to ⅔ of one Zn or Cu cation per block. The crystal formulae of $Zn_2Nb_{34}O_{87}$ can be described as an isostructural phase to $Cu_2Nb_{34}O_{87}$ with slight differences in some bond lengths and bond enthalpies.

The total crystal composition of the materials described herein are preferably charge neutral and thermodynamically favourable to follow the above description. Oxygen-deficient structures e.g. through introduction of oxygen vacancy point defects are preferable when reducing the material's electrical resistance such that $M_xO_y$ becomes $M_xO_{y-\delta}$. Oxygen deficient structures may contain shear defects.

Structures that have had cations (i.e. Zn, Cu, and Nb) or anions (i.e. O) substituted may have been so with matching valency (i.e. a 5+ cation for equal proportions of a 4+ and 6+ cation) or with unmatched valency, which can induce oxygen deficiency or excess if substitution takes place at equivalent crystal sites. Substitution may also take place at different crystal sites, such as interstitial sites.

The crystal structure of a material may be determined by analysis of X-ray diffraction (XRD) patterns, as is widely known. For instance, XRD patterns obtained from a given material can be compared to known XRD patterns to confirm the crystal structure, e.g. via public databases such as the ICDD crystallography database. Rietveld analysis can also be used to determine the crystal structure of materials, in particular for the unit cell parameters. Therefore, the active electrode material may have a Wadsley-Roth crystal structure, as determined by X-ray diffraction.

Preferably, the crystal structure of the mixed niobium oxide, as determined by X-ray diffraction, corresponds to the crystal structure of $Zn_2Nb_{34}O_{87}$ or $Cu_2Nb_{34}O_{87}$; most preferably $Zn_2Nb_{34}O_{87}$. In this way, it can be confirmed that the 'base' material has been modified without significantly affecting the crystal structure, which is believed to have advantageous properties for use as an active electrode material. The crystal structure of $Zn_2Nb_{34}O_{87}$ may be found at ICDD crystallography database entry JCPDS 28-1478.

The mixed niobium oxide with cation/anion exchange may have unit cell parameters a, b, and c wherein a is 15.52-15.58 Å preferably 15.53-15.57 Å, b is 3.79-3.84 Å preferably 3.80-3.83 Å, and c=20.53-20.66 Å preferably 20.54-20.65 Å. The mixed niobium oxide may have unit cell parameters $\alpha$ and $\gamma$ each being about 90°, preferably wherein $\alpha=\gamma=90°$; whereas $\beta$ is 113.05-113.75° preferably 113.08-113.690 and unit cell volume is 1115-1135 Å³ preferably 1117-1133 Å³. Unit cell parameters may be determined by X-ray diffraction. The mixed niobium oxide may have a crystallite size of 5-150 nm, preferably 30-60 nm, determined according to the Scherrer equation.

Here the term 'corresponds' is intended to reflect that peaks in an X-ray diffraction pattern may be shifted by no more than 0.5 degrees (preferably shifted by no more than 0.25 degrees, more preferably shifted by no more than 0.1 degrees) from corresponding peaks in an X-ray diffraction pattern of the material listed above.

The mixed niobium oxide has the composition $M1_aM2_{2-a}M3_bNb_{34-b}O_{87-c-d}Q_d$, wherein:

M1 and M2 are different;
M1 is selected from Mg, Ca, Sr, Y, La, Ce, Ti, Zr, Hf, V, Nb, Ta, Cr, Mo, W, Mn, Fe, Co, Ni, Cu, Zn, Cd, B, Al, Ga, In, Si, Ge, Sn, Pb, P, Sb, Bi and mixtures thereof;
M2 is Zn or Cu;
M3 is selected from Mg, Ca, Sr, Y, La, Ce, Ti, Zr, Hf, V, Ta, Cr, Mo, W, Mn, Fe, Co, Ni, Cu, Zn, Cd, B, Al, Ga, In, Si, Ge, Sn, Pb, P, Sb, Bi, and mixtures thereof;
Q is selected from F, Cl, Br, I, N, S, Se, and mixtures thereof;
0≤a<1.0; 0≤b≤3.4; −0.5≤c≤4.35; 0≤d≤4.35;
one or more of a, b, c, and d does not equal 0; and
when a, b, and d equal zero, c is greater than zero.

By 'and mixtures thereof', it is intended that M1, M3, and Q may each represent two or more elements from their respective lists. An example of such a material is $Mg_{0.1}Ge_{0.1}Zn_{1.8}Nb_{34}O_{87.1}$. Here, M1 is $Mg_aGe_a^-$ (where a'+a''=a), M2 is Zn, a=0.2, b=0, c=−0.1, d=0. Here, c has been calculated assuming that each cation adopts its typical oxidation state, i.e. $Mg^{2+}$, $Ge^{4+}$, $Zn^{2+}$, and $Nb^{5+}$.

The precise values of a, b, c, d within the ranges defined may be selected to provide a charge balanced, or substantially charge balanced, crystal structure. Additionally or alternatively, the precise values of a, b, c, d within the ranges defined may be selected to provide a thermodynamically stable, or thermodynamically metastable, crystal structure.

When exchange of the cations or anions in the structure (i.e. Zn, Cu, Nb, O) have taken place without preserving the initial valency, this can give rise to both oxygen deficiency and excess. For example, a material that substitutes $Zn^{2+}$ by $Ge^{4+}$ to some extent will demonstrate minor oxygen excess (i.e. ZnO vs $GeO_2$), whereas substitution of $Nb^{5+}$ by $Al^{3+}$ will show a minor oxygen deficiency (i.e. $Nb_2O_5$ vs $Al_2O_3$). Oxygen deficiency can also be induced through thermal treatment in inert or reducing conditions, which results in induced oxygen vacancy defects in the structure.

There may be partial oxidation or partial reduction to compensate for exchange which does not preserve the initial valency. For example, substitution of $Zn^{2+}$ by $Ge^{4+}$ may be compensated at least in part by reduction of some $Nb^{5+}$ to $Nb^{4+}$.

M2 is Zn or Cu. Preferably, M2 is Zn in which case the material is based on $Zn_2Nb_{34}O_{87}$.

M1 is a cation which substitutes for M2 in the crystal structure. M1 may be selected from Mg, Ti, Zr, Hf, V, Nb, Ta, Cr, Mo, W, Mn, Fe, Co, Ni, Cu, Zn, Cd, B, Al, Ga, Si, Ge, Sn, P, and mixtures thereof; preferably Mg, Ti, Zr, V, Nb, Cr, Mo, W, Mn, Fe, Co, Ni, Cu, Zn, B, Al, Si, Ge, P, and mixtures thereof; most preferably Mg, Zr, V, Cr, Mo, W, Fe, Cu, Zn, Al, Ge, P, and mixtures thereof. M1 may have a different valency than $M2^{2+}$. This gives rise to oxygen deficiency or excess. Optionally, M1 has an equal or higher valency than $M2^{2+}$, preferably higher.

M1 may also be selected from each of the specific elements used as such in the examples.

When more than one element is present as M1 or M3 it will be understood that the valency refers to M1 or M3 as a whole. For example, if 25 at % of M1 is Ti and 75 at % of M1 is W the valency M1 is 0.25×4 (the contribution from Ti)+0.75×6 (the contribution from W).

M1 preferably has a different ionic radius than $M2^{2+}$, most preferably a smaller ionic radius. This gives rise to changing unit cell size and local distortions in crystal structure, providing the advantages discussed herein. Ionic radii referred to herein are the Shannon ionic radii (available at R. D. Shannon, *Acta Cryst.*, A32, 1976, 751-767) at the coordination and valency that the ion would be expected to adopt in the crystal structure of the mixed niobium oxide. For example, the crystal structure of $Zn_2Nb_{34}O_{87}$ includes $Nb^{5+}O_6$ octahedra and $Zn^{2+}$ $O_6$ octahedra. Accordingly, when M3 is Zr the ionic radius is taken as that of 6-coordinate $Zr^{4+}$ since this is typical valency and coordination of Zr when replacing Nb in $Zn_2Nb_{34}O_{87}$.

The amount of M1 is defined by a, meeting the criterion 0≤a<1.0. a may be 0≤a≤0.6, preferably 0≤a≤0.2. Most preferably, a>0, for example a≥0.01. Higher values of a may be more readily achieved when M1 has the same valency as M2. When M1 comprises a cation with a 2+ valency (for example Mg) a may be 0≤a<1.0. When M1 does not comprise a cation with a 2+ valency a may be 0≤a≤0.15.

M3 is a cation which substitutes for Nb in the crystal structure. M3 may be selected from Mg, Ti, Zr, Hf, V, Ta, Cr, Mo, W, Mn, Fe, Co, Ni, Cu, Zn, Cd, B, Al, Ga, Si, Sn, P, and mixtures thereof; preferably Mg, Ti, Zr, V, Cr, Mo, W, Mn, Fe, Co, Ni, Cu, Zn, Cd, B, Al, Si, P, and mixtures thereof; most preferably Ti, Zr, V, Cr, Mo, W, Fe, Cu, Zn, Al, P, and mixtures thereof. M3 may have a different valency than $Nb^{5+}$. This gives rise to oxygen deficiency or excess. Preferably, M3 has a lower valency than $Nb^{5+}$. This gives rise to oxygen deficiency, i.e. the presence of oxygen vacancies providing the advantages discussed herein.

M3 may also be selected from each of the specific elements used as such in the examples.

M3 preferably has a different ionic radius than $Nb^{5+}$, most preferably a larger ionic radius. This gives rise to changing unit cell size and local distortions in crystal structure, providing the advantages discussed herein.

The amount of M3 is defined by b, meeting the criterion 0≤b≤3.4. b may be 0≤b≤1.5, preferably 0≤b≤0.3. In each of these cases b may be >0, e.g. b≥0.01. Higher values of b may be more readily achieved when M3 has the same valency as $Nb^{5+}$. When M3 comprises a cation with a 5+ valency (for example Ta) b may be 0≤b≤3.4. When M3 does not comprise a cation with a 5+ valency b may be 0≤b≤0.2.

Surprisingly, it has been found that the cation-substitution approach in accordance with the invention can lead to a mixed niobium oxide that is more economical to synthesise than the unmodified 'base' material. Optionally, both a and b are >0. When both a and b are >0 the 'base' material has been substituted at both the M2 site and at the Nb site.

c reflects the oxygen content of the mixed niobium oxide. When c is greater than 0, it forms an oxygen-deficient material, i.e. the material has oxygen vacancies. Such a material would not have precise charge balance without changes to cation oxygen state, but is considered to be "substantially charge balanced" as indicated above. Alternatively, c may equal 0, in which it is not an oxygen-deficient material. c may be below 0, which is a material with oxygen-excess. c may be −0.25≤c≤4.35.

When c is 4.35, the number of oxygen vacancies is equivalent to 5% of the total oxygen in the crystal structure. c may be greater than 0.0435, greater than 0.087, greater than 0.174, or greater than 0.435. c may be between 0 and 2, between 0 and 0.75, between 0 and 0.5, or between 0 and 0.25. For example, c may satisfy 0.01≤c≤4.35. When the material is oxygen-deficient, for example with induced oxygen deficiency, the electrochemical properties of the material may be improved, for example, resistance measurements may show improved conductivity in comparison to equivalent non-oxygen-deficient materials. As will be understood, the percentage values expressed herein are in atomic percent.

The invention relates to mixed niobium oxides which may comprise oxygen vacancies (oxygen-deficient mixed niobium oxides), or which may have oxygen excess. Oxygen vacancies may be formed in a mixed niobium oxide by the sub-valent substitution of a base material as described above, and oxygen excess may be formed in a mixed niobium oxide by substitution for increased valency. Oxygen vacancies may also be formed by heating a mixed niobium oxide under reducing conditions, which may be termed forming induced oxygen deficiency. The amount of oxygen vacancies and excess may be expressed relative to the total amount of oxygen in the base material, i.e. the amount of oxygen in the un-substituted material (e.g. $Zn_2Nb_{34}O_{87}$).

A number of methods exist for determining whether oxygen deficiency, e.g. oxygen vacancies, is present in a material. For example, Thermogravimetric Analysis (TGA) may be performed to measure the mass change of a material when heated in air atmosphere. A material comprising oxygen vacancies can increase in mass when heated in air due to the material "re-oxidising" and the oxygen vacancies being filled by oxide anions. The magnitude of the mass increase may be used to quantify the concentration of oxygen vacancies in the material, on the assumption that the mass increase occurs entirely due to the oxygen vacancies being filled. It should be noted that a material comprising oxygen vacancies may show an initial mass increase as the oxygen vacancies are filled, followed by a mass decrease at higher temperatures if the material undergoes thermal decomposition. Moreover, there may be overlapping mass loss and mass gain processes, meaning that some materials comprising oxygen vacancies may not show a mass gain (and sometimes not a mass loss or gain) during TGA analysis.

Other methods of determining whether oxygen deficiency e.g. oxygen vacancies, is present include Raman spectroscopy, electron paramagnetic resonance (EPR), X-ray photoelectron spectroscopy (XPS, e.g. of oxygen 1s and/or and of cations in a mixed oxide), X-ray absorption near-edge structure (XANES, e.g. of cations in a mixed metal oxide), and TEM (e.g. scanning TEM (STEM) equipped with high-angle annular darkfield (HAADF) and annular bright-field (ABF) detectors). The presence of oxygen deficiency can be qualitatively determined by assessing the colour of a material relative to a non-oxygen-deficient sample of the same material, indicative of changes to its electronic band structure through interaction with light. For example, non-oxygen deficient stoichiometric $Zn_2Nb_{34}O_{87}$ has a white colour. $Zn_2Nb_{34}O_{<87}$ with induced oxygen deficiency has a grey/black. The presence of vacancies can also be inferred from the properties, e.g. electrical conductivity, of a stoichiometric material compared to those of an oxygen-deficient material.

When d>0, additional anions Q are introduced into the mixed niobium oxide. Due to their differing electronic structure (i.e. $F^-$ vs $O^{2-}$), and differing ionic radii (6-coordinate $O^{2-}$=1.40 Å, 6-coordinate $F^-$=1.33 Å) they may improve electrochemical performance in the active material. This is due to altering unit cell characteristics with differing ionic radii allowing for improved Li ion capacity, or improved Coulombic efficiencies by improving reversibility. They may additionally improve electrical conductivity as for oxygen vacancy defects, or sub-valent cation substitutions, by altering the electronic structure of the crystal (i.e. doping effects). d may be 0≤d≤3.0, or 0≤d≤2.17. In each of these cases d may be >0. Q may be selected from F, Cl, N, S, and mixtures thereof; or F, N, and mixtures thereof; or Q is F.

Optionally d=0, in which case the material has the composition $M1_aM2_{2-a}M3_bNb_{34}O_{87-c}$ where M1, M2, M3, a, b, and c are as defined herein. Advantageously, materials where d=0 are free from anion Q and may be easier to synthesise.

When a>0 and b=d=0 the material has the composition $M1_aM2_{2-a}Nb_{34}O_{87-c}$ where M1, M2, a, and c are as defined herein, for example 0≤c≤4.35. This represents a material which has been modified at the M2 site and optionally modified by induced oxygen deficiency. Such materials represent a particularly effective way to improve the properties of the 'base' oxide $M2_2Nb_{34}O_{87}$ by simple synthetic means. Here, M1 may represent Ti, Mg, V, Cr, W, Zr, Mo, Cu, Ga, Ge, Ni, Al, Hf, Ta, Zn and mixtures thereof; preferably Ti, Mg, V, Cr, W, Zr, Mo, Ga, Ge, Al, Zn, and mixtures thereof.

When a=b=d=0 and c>0 the material has the composition $M2_2Nb_{34}O_{87-c}$ where M2 and c are as defined herein. This represents a material which has been modified solely by inducing oxygen deficiency, providing improved properties as shown in the examples. For example, materials where a=b=d=0 and c>0 have been found to have surprisingly improved electronic conductivity.

It will be understood that the discussion of the variables of the composition (M1, M2, M3, Q, a, b, c, and d) is intended to be read in combination. For example, preferably M1 is selected from Mg, Ti, Zr, V, Nb, Cr, Mo, W, Mn, Fe, Co, Ni, Cu, Zn, B, Al, Si, Ge, P, and mixtures thereof and M3 is selected from Mg, Ti, Zr, V, Cr, Mo, W, Mn, Fe, Co, Ni, Cu, Zn, Cd, B, Al, Si, P, and mixtures thereof and Q is selected from F, Cl, N, S, and mixtures thereof. Preferably $0 \leq a \leq 0.6$, $0 \leq b \leq 1.5$, $0 \leq c \leq 4.35$, and $0 \leq d \leq 3.0$.

For example, the mixed niobium oxide may have the composition $M1_aM2_{2-a}M3_bNb_{34-b}O_{87-c-d}Q_d$, wherein:
M1 and M2 are different;
M1 is selected from Mg, Ti, Zr, V, Nb, Cr, Mo, W, Mn, Fe, Co, Ni, Cu, Zn, B, Al, Si, Ge, P, and mixtures thereof;
M2 is Zn or Cu;
M3 is selected from Mg, Ti, Zr, V, Cr, Mo, W, Mn, Fe, Co, Ni, Cu, Zn, Cd, B, Al, Si, P, and mixtures thereof;
Q is selected from F, N, and mixtures thereof;
$0 \leq a \leq 0.6$; $0 \leq b \leq 1.5$; $-0.5 \leq c \leq 4.35$; $0 \leq d \leq 4.35$;
one or more of a, b, c, and d does not equal 0; and
when a, b, and d equal zero, c is greater than zero.

For example, the mixed niobium oxide may have the composition $M1_aZn_{2-a}M3_bNb_{34-b}O_{87-c-d}Q_d$, wherein:
M1 is selected from Mg, Zr, V, Cr, Mo, W, Fe, Cu, Al, Ge, P, and mixtures thereof;
M3 is selected from Ti, Zr, V, Cr, Mo, W, Fe, Cu, Zn, Al, P, and mixtures thereof;
Q is selected from F, N, and mixtures thereof;
$0 < a \leq 0.2$; $0 \leq b \leq 0.3$; $0 \leq c \leq 4.35$; $0 \leq d \leq 3.0$.

M1, M3, and Q may also be selected from each of the specific elements used as these dopants in the examples.

Optionally, the mixed niobium oxide is free from titanium.

The mixed niobium oxide may have the composition $M1_aM2_{2-a}M3_bNb_{34-b}O_{87-c}$, wherein:
M1 is selected from Cr, Al, Ge, and mixtures thereof, preferably wherein M1 is Cr;
M2 is Zn or Cu, preferably wherein M2 is Zn;
M3 is selected from Ti, Zr, Fe, and mixtures thereof and optionally comprises Ti, preferably wherein M3 is selected from Ti, Zr, and mixtures thereof and optionally comprises Ti, most preferably wherein M3 is Ti;
$0 < a < 1.0$, preferably $0.01 < a < 1.0$;
$0 < b \leq 1.5$, preferably $0.01 < b < 1.0$;
$-0.5 \leq c \leq 4.35$, preferably $-0.5 \leq c \leq 2$, most preferably c=0.

The mixed niobium oxide may have the composition $Cr_aZn_{2-a}M3_bNb_{34-b}O_{87-c}$, wherein:
M3 is selected from Ti, Zr, and mixtures thereof and optionally comprises Ti, preferably wherein M3 is Ti;
$0.01 < a < 1.0$, preferably $0.1 < a < 1.0$;
$0.01 < b \leq 1.0$, preferably $0.1 < b < 1.0$;
$-0.5 \leq c \leq 4.35$, $-0.5 \leq c \leq 2$, preferably c=0.

The mixed niobium oxide may further comprise Li and/or Na. For example, Li and/or Na may enter the crystal structure when the mixed niobium oxide is used in a metal-ion battery electrode.

The mixed niobium oxide is preferably in particulate form. The material may have a $D_{50}$ particle diameter in the range of 0.1-100 μm, or 0.5-50 μm, or 1-20 μm. These particle sizes are advantageous because they are easy to process and fabricate into electrodes. Moreover, these particle sizes avoid the need to use complex and/or expensive methods for providing nanosized particles. Nanosized particles (e.g. particles having a $D_{50}$ particle diameter of 100 nm or less) are typically more complex to synthesise and require additional safety considerations.

The mixed niobium oxide may have a Di particle diameter of at least 0.05 μm, or at least 0.1 μm, or at least 0.5 μm, or at least 1 μm. By maintaining a $D_{10}$ particle diameter within these ranges, the potential for parasitic reactions in a Li ion cell is reduced from having reduced surface area, and it is easier to process with less binder in the electrode slurry.

The mixed niobium oxide may have a $D_{90}$ particle diameter of no more than 200 μm, no more than 100 μm, no more than 50 μm, or no more than 20 μm. By maintaining a $D_{90}$ particle diameter within these ranges, the proportion of the particle size distribution with large particle sizes is minimised, making the material easier to manufacture into a homogenous electrode.

The term "particle diameter" refers to the equivalent spherical diameter (esd), i.e. the diameter of a sphere having the same volume as a given particle, where the particle volume is understood to include the volume of any intra-particle pores. The terms "$D_n$" and "$D_n$ particle diameter" refer to the diameter below which n % by volume of the particle population is found, i.e. the terms "$D_{50}$" and "$D_{50}$ particle diameter" refer to the volume-based median particle diameter below which 50% by volume of the particle population is found. Where a material comprises primary crystallites agglomerated into secondary particles, it will be understood that the particle diameter refers to the diameter of the secondary particles. Particle diameters can be determined by laser diffraction. Particle diameters can be determined in accordance with ISO 13320:2009, for example using Mie theory.

The mixed niobium oxide may have a BET surface area in the range of 0.1-100 $m^2/g$, or 0.5-50 $m^2/g$, or 1-20 $m^2/g$. In general, a low BET surface area is preferred in order to minimise the reaction of the mixed niobium oxide with the electrolyte, e.g. minimising the formation of solid electrolyte interphase (SEI) layers during the first charge-discharge cycle of an electrode comprising the material. However, a BET surface area which is too low results in unacceptably low charging rate and capacity due to the inaccessibility of the bulk of the mixed niobium oxide to metal ions in the surrounding electrolyte.

The term "BET surface area" refers to the surface area per unit mass calculated from a measurement of the physical adsorption of gas molecules on a solid surface, using the Brunauer-Emmett-Teller theory. For example, BET surface areas can be determined in accordance with ISO 9277:2010.

The specific capacity/reversible delithiation capacity of the mixed niobium oxide may be 180 mAh/g or more, 190 mAh/g or more, or 197 mAh/g or more. Here, specific capacity is defined as that measured in the 2nd cycle of a half cell galvanostatic cycling test at a rate of 0.1 C with a voltage window of 1.1-3.0 V vs Li/Li+ in a half cell. It may be advantageous to provide materials having a high specific capacity, as this can provide improved performance in an electrochemical device comprising the mixed niobium oxide.

When formulated or coated as an electrode according to the below description (optionally with conductive carbon additive and binder materials), the sheet resistance of the active electrode material may be 2.5 kΩ per square or less, more preferably 1.2 kΩ per square or less, which may be measured as defined in the examples. Sheet resistance can be a useful proxy measurement of the electronic conductivity of such materials. It may be advantageous to provide materials having a suitably low sheet resistance, as this can provide improved performance in an electrochemical device comprising the mixed niobium oxide.

The mixed niobium oxide may have a lithium diffusion rate greater than $10^{-15}$ cm$^2$ s$^{-1}$, or more preferably greater than $10^{-13}$ cm$^2$ s$^{-1}$. It may be advantageous to provide materials having a suitably high lithium diffusion rate, as this can provide improved performance in an electrochemical device comprising the mixed niobium oxide.

The mixed niobium oxide may be able to form composite electrodes with a suitable binder and conductive additive according to the below description to provide an electrode density of 2.5 g/cm$^3$ or more after calendaring. This enables a composite electrode with an electrode porosity (calculated by the measured electrode density/average of the true density of each component) in the range of 30-40%, in-line with industrial requirements for high energy and high power cells. For example, electrode densities of up to 2.9 g/cm$^3$ have been achieved. It may be advantageous to provide materials having such an electrode density, as this can provide improved performance in an electrochemical device comprising the mixed niobium oxide. Specifically, when the electrode density is high, high volumetric capacities can be achieved, as gravimetric capacity×electrode density×mixed niobium oxide fraction=volumetric capacity.

Initial coulombic efficiency has been measured as the difference in the lithiation and de-lithiation capacity on the 1$^{st}$ charge/discharge cycle at C/10 in a half-cell. The initial coulombic efficiency of the active electrode material may be greater than 97.9%, or greater than 98.8%. It may be advantageous to provide materials having a suitably high initial coulombic efficiency, as this can provide improved performance in an electrochemical device comprising the mixed niobium oxide.

The active electrode material of the first aspect of the invention may comprise the mixed niobium oxide and at least one other component, optionally wherein the at least one other component is selected from a binder, a solvent, a conductive additive, a different active electrode material, and mixtures thereof. Such a composition is useful for preparing an electrode, e.g. an anode for a lithium-ion battery. Preferably, the different active electrode material is selected from a different mixed niobium oxide having a composition as defined by the first aspect, a lithium titanium oxide, a niobium oxide, and mixtures thereof. Alternatively, the active electrode material may consist of the mixed niobium oxide.

The active electrode material may comprise the mixed niobium oxide and a lithium titanium oxide, preferably a mixture of the mixed niobium oxide and a lithium titanium oxide.

The lithium titanium oxide preferably has a spinel or ramsdellite crystal structure, e.g. as determined by X-ray diffraction. An example of a lithium titanium oxide having a spinel crystal structure is $Li_4Ti_5O_{12}$. An example of a lithium titanium oxide having a ramsdellite crystal structure is $Li_2Ti_3O_7$. These materials have been shown to have good properties for use as active electrode materials. Therefore, the lithium titanium oxide may have a crystal structure as determined by X-ray diffraction corresponding to $Li_4Ti_5O_{12}$ and/or $Li_2Ti_3O_7$. The lithium titanium oxide may be selected from $Li_4Ti_5O_{12}$, $Li_2Ti_3O_7$, and mixtures thereof.

The lithium titanium oxide may be doped with additional cations or anions. The lithium titanium oxide may be oxygen deficient. The lithium titanium oxide may comprise a coating, optionally wherein the coating is selected from carbon, polymers, metals, metal oxides, metalloids, phosphates, and fluorides.

The lithium titanium oxide may be synthesised by conventional ceramic techniques, for example solid-state synthesis or sol-gel synthesis. Alternatively, the lithium titanium oxide may be obtained from a commercial supplier.

The lithium titanium oxide is in preferably in particulate form. The lithium titanium oxide may have a $D_{50}$ particle diameter in the range of 0.1-50 µm, or 0.25-20 µm, or 0.5-15 µm. The lithium titanium oxide may have a $D_{10}$ particle diameter of at least 0.01 µm, or at least 0.1 µm, or at least 0.5 µm. The lithium titanium oxide may have a $D_{90}$ particle diameter of no more than 100 µm, no more than 50 µm, or no more than 25 µm. By maintaining a $D_{90}$ particle diameter in this range the packing of lithium titanium oxide particles in the mixture with mixed niobium oxide particles is improved.

Lithium titanium oxides are typically used in battery anodes at small particle sizes due to the low electronic conductivity of the material. In contrast, the mixed niobium oxide as defined herein may be used at larger particle sizes since it typically has a higher lithium ion diffusion coefficient than lithium titanium oxide. Advantageously, in the composition the lithium titanium oxide may have a smaller particle size than the mixed niobium oxide, for example such that the ratio of the $D_{50}$ particle diameter of the lithium titanium oxide to the $D_{50}$ particle diameter of the mixed niobium oxide is in the range of 0.01:1 to 0.9:1, or 0.1:1 to 0.7:1. In this way, the smaller lithium titanium oxide particles may be accommodated in the voids between the larger mixed niobium oxide particles, increasing the packing efficiency of the composition.

The lithium titanium oxide may have a BET surface area in the range of 0.1-100 m$^2$/g, or 1-50 m$^2$/g, or 3-30 m$^2$/g.

The ratio by mass of the lithium titanium oxide to the mixed niobium oxide may be in the range of 0.5:99.5 to 99.5:0.5, preferably in the range of 2:98 to 98:2. In one implementation the active electrode material comprises a higher proportion of the lithium titanium oxide than the mixed niobium oxide, e.g. the ratio by mass of at least 2:1, at least 5:1, or at least 8:1. Advantageously, this allows the mixed niobium oxide to be incrementally introduced into existing electrodes based on lithium titanium oxides without requiring a large change in manufacturing techniques, providing an efficient way of improving the properties of existing electrodes. In another implementation the active electrode material has a higher proportion of the mixed niobium oxide than the lithium titanium oxide, e.g. such that the ratio by mass of the lithium titanium oxide to the mixed niobium oxide is less than 1:2, or less than 1:5, or less than 1:8. Advantageously, this allows for the cost of the active electrode material to be reduced by replacing some of the mixed niobium oxide with lithium titanium oxide.

The active electrode material may comprise the mixed niobium oxide and a niobium oxide. The niobium oxide may be selected from $Nb_{12}O_{29}$, $NbO_2$, $NbO$, and $Nb_2O_5$. Preferably, the niobium oxide is $Nb_2O_5$.

The niobium oxide may be doped with additional cations or anions, for example provided that the crystal structure of the niobium oxide corresponds to the crystal structure of an oxide consisting of Nb and O, e.g. $Nb_{12}O_{29}$, $NbO_2$, $NbO$, and $Nb_2O_5$. The niobium oxide may be oxygen deficient. The niobium oxide may comprise a coating, optionally wherein the coating is selected from carbon, polymers, metals, metal oxides, metalloids, phosphates, and fluorides.

The niobium oxide may have the crystal structure of $Nb_{12}O_{29}$, $NbO_2$, $NbO$, or $Nb_2O_5$ as determined by X-ray diffraction. For example, the niobium oxide may have the crystal structure of orthorhombic $Nb_2O_5$ or the crystal structure of monoclinic $Nb_2O_5$. Preferably, the niobium oxide has the crystal structure of monoclinic $Nb_2O_5$, most preferably the crystal structure of $H-Nb_2O_5$. Further information on crystal structures of $Nb_2O_5$ may be found at Griffith et al., *J. Am. Chem. Soc.* 2016, 138, 28, 8888-8899.

The niobium oxide may be synthesised by conventional ceramic techniques, for example solid-state synthesis or sol-gel synthesis. Alternatively, the niobium oxide may be obtained from a commercial supplier.

The niobium oxide is in preferably in particulate form. The niobium oxide may have a $D_{50}$ particle diameter in the range of 0.1-100 µm, or 0.5-50 µm, or 1-20 µm. The niobium oxide may have a $D_{10}$ particle diameter of at least 0.05 µm, or at least 0.5 µm, or at least 1 µm. The niobium oxide may have a $D_{50}$ particle diameter of no more than 100 µm, no more than 50 µm, or no more than 25 µm. By maintaining a $D_{90}$ particle diameter in this range the packing of niobium oxide particles in the mixture with mixed niobium oxide particles is improved.

The niobium oxide may have a BET surface area in the range of 0.1-100 $m^2/g$, or 1-50 $m^2/g$, or 1-20 $m^2/g$.

The ratio by mass of the niobium oxide to the mixed niobium oxide may be in the range of 0.5:99.5 to 99.5:0.5, or in the range of 2:98 to 98:2, or preferably in the range of 15:85 to 35:55.

The invention also provides an electrode comprising the active electrode material of the first aspect of the invention in electrical contact with a current collector. The electrode may form part of a cell. The electrode may form an anode as part of metal-ion battery, optionally a lithium-ion battery.

The invention also provides the use of the active electrode material of the first aspect of the invention in an anode for a metal-ion battery, optionally wherein the metal-ion battery is a lithium-ion battery.

A further implementation of the invention is an electrochemical device comprising an anode, a cathode, and an electrolyte disposed between the anode and the cathode, wherein the anode comprises an active electrode material according to the first aspect of the invention; optionally wherein the electrochemical device is metal-ion battery such as a lithium-ion battery or a sodium-ion battery. Preferably, the electrochemical device is a lithium-ion battery having a reversible anode active material specific capacity of greater than 190 mAh/g at 20 mA/g, wherein the battery can be charged and discharged at current densities relative to the anode active material of 200 mA/g or more, or 1000 mA/g or more, or 2000 mA/g or more, or 4000 mA/g or more whilst retaining greater than 70% of the initial cell capacity at 20 mA/g. It has been found that use of the active electrode materials of the first aspect of the invention can enable the production of a lithium-ion battery with this combination of properties, representing a lithium-ion battery that is particularly suitable for use in applications where high charge and discharge current densities are desired. Notably, the examples have shown that active electrode materials according to the first aspect of the invention have improved electronic conductivity and improved delithiation voltage at high C-rates.

The mixed niobium oxide may be synthesised by conventional ceramic techniques. For example, the material be made by one or more of solid-state synthesis or sol-gel synthesis. The material may additionally be synthesised by one or more of alternative techniques commonly used, such as hydrothermal or microwave hydrothermal synthesis, solvothermal or microwave solvothermal synthesis, coprecipitation synthesis, spark or microwave plasma synthesis, combustion synthesis, electrospinning, and mechanical alloying.

The second aspect of the invention provides a method of making a mixed niobium oxide as defined by the first aspect, the method comprising steps of: providing one or more precursor materials; mixing said precursor materials to form a precursor material mixture; and heat treating the precursor material mixture in a temperature range from 400° C.-1350° C. or 800-1350° C., thereby providing the mixed niobium oxide.

To provide a mixed niobium oxide comprising element Q the method may further comprise the steps of: mixing the mixed niobium oxide with a precursor comprising element Q to provide a further precursor material mixture; and heat treating the further precursor material mixture in a temperature range from 300-1200° C. or 800-1200° C. optionally under reducing conditions, thereby providing the mixed niobium oxide comprising element Q.

For example, to provide a mixed niobium oxide comprising N as element Q, the method may further comprise the steps of: mixing the mixed niobium oxide with a precursor comprising N (for example melamine) to provide a further precursor material mixture; and heat treating the further precursor material mixture in a temperature range from 300-1200° C. under reducing conditions (for example in $N_2$), thereby providing the mixed niobium oxide comprising N as element Q.

For example, to provide a mixed niobium oxide comprising F as element Q, the method may further comprise the steps of: mixing the mixed niobium oxide with a precursor comprising F (for example polyvinylidene fluoride) to provide a further precursor material mixture; and heat treating the further precursor material mixture in a temperature range from 300-1200° C. under oxidising conditions (for example in air), thereby providing the mixed niobium oxide comprising F as element Q.

The method may comprise the further step of heat treating the mixed niobium oxide or the mixed niobium oxide comprising element Q in a temperature range from 400-1350° C. or 800-1350° C. under reducing conditions, thereby inducing oxygen vacancies in the mixed niobium oxide. The induced oxygen vacancies may be in addition to oxygen vacancies already present in the mixed niobium oxide, e.g. already present due to sub-valent substitution of M2 and/or Nb with M1 and/or M3. Alternatively, the induced oxygen vacancies may be new oxygen vacancies, e.g. if M1 and M3 have the same valency as M2 and Nb. The presence of induced oxygen vacancies provides the advantages discussed herein.

The precursor materials may include one or more metal oxides, metal hydroxides, metal salts or ammonium salts. For example, the precursor materials may include one or more metal oxides or metal salts of different oxidation states and/or of different crystal structure. Examples of suitable precursor materials include but are not limited to: $Nb_2O_5$, $Nb(OH)_5$, Niobic Acid, NbO, Ammonium Niobate Oxalate, $NH_4H_2PO_4$, $(NH_4)_2PO_4$, $(NH_4)_3PO_4$, $P_2O_5$, $H_3PO_4$, $Ta_2O_5$, $WO_3$, $ZrO_2$, $TiO_2$, $MoO_3$, $V_2O_5$, $ZrO_2$, $CuO$, $ZnO$, $Al_2O_3$, $K_2O$, $KOH$, $CaO$, $GeO_2$, $Ga_2O_3$, $SnO_2$, $CoO$, $Co_2O_3$, $Fe_2O_3$, $Fe_3O_4$, $MnO$, $MnO_2$, $NiO$, $Ni_2O_3$, $H_3BO_3$, $ZnO$, and $MgO$. The precursor materials may not comprise a metal oxide, or may comprise ion sources other than oxides. For example, the precursor materials may comprise metal salts (e.g. $NO_3^-$, $SO_3^-$) or other compounds (e.g. oxalates, carbonates). For the substitution of the oxygen anion with other electronegative anions Q, the precursors comprising element Q may include one or more organic compounds, polymers, inorganic salts, organic salts, gases, or ammonium salts. Examples of suitable precursor materials comprising element Q include but are not limited to: melamine, $NH_4HCO_3$, $NH_3$, $NH_4F$, PVDF, PTFE, $NH_4Cl$, $NH_4Br$, $NH_4I$, $Br_2$, $Cl_2$, $I_2$, ammonium oxychloride amide, and hexamethylenetetramine.

Some or all of the precursor materials may be particulate materials. Where they are particulate materials, preferably they have a $D_{50}$ particle diameter of less than 20 µm in diameter, for example from 10 nm to 20 µm. Providing particulate materials with such a particle diameter can help to promote more intimate mixing of precursor materials, thereby resulting in more efficient solid-state reaction during the heat treatment step. However, it is not essential that the precursor materials have an initial particle size of <20 µm in diameter, as the particle size of the one or more precursor materials may be mechanically reduced during the step of mixing said precursor materials to form a precursor material mixture.

The step of mixing the precursor materials to form a precursor material mixture and/or further precursor material mixture may be performed by a process selected from (but not limited to): dry or wet planetary ball milling, rolling ball milling, high energy ball milling, high shear milling, air jet milling, steam jet milling, planetary mixing, and/or impact milling. The force used for mixing/milling may depend on the morphology of the precursor materials. For example, where some or all of the precursor materials have larger particle sizes (e.g. a $D_{50}$ particle diameter of greater than 20 µm), the milling force may be selected to reduce the particle diameter of the precursor materials such that the such that the particle diameter of the precursor material mixture is reduced to 20 µm in diameter or lower. When the particle diameter of particles in the precursor material mixture is 20 µm or less, this can promote a more efficient solid-state reaction of the precursor materials in the precursor material mixture during the heat treatment step. The solid state synthesis may also be undertaken in pellets formed at high pressure (>10 MPa) from the precursor powders.

The step of heat treating the precursor material mixture and/or the further precursor material mixture may be performed for a time of from 1 hour to 24 hours, more preferably from 3 hours to 18 hours. For example, the heat treatment step may be performed for 1 hour or more, 2 hours or more, 3 hours or more, 6 hours or more, or 12 hours or more. The heat treatment step may be performed for 24 hours or less, 18 hours or less, 16 hours or less, or 12 hours or less.

The step of heat treating the precursor material mixture may be performed in a gaseous atmosphere, preferably air. Suitable gaseous atmospheres include: air, $N_2$, Ar, He, $CO_2$, CO, $O_2$, $H_2$, $NH_3$ and mixtures thereof. The gaseous atmosphere may be a reducing atmosphere. Where it is desired to make an oxygen-deficient material, preferably the step of heat treating the precursor material mixture is performed in an inert or reducing atmosphere.

The step of heat treating the further precursor material mixture is performed under reducing conditions. Reducing conditions include under an inert gas such as nitrogen, helium, argon; or under a mixture of an inert gas and hydrogen; or under vacuum. Preferably, the step of heat treating the further precursor material mixture comprises heating under inert gas.

The further step of heat treating the mixed niobium oxide and/or the mixed niobium oxide comprising element Q under reducing conditions may be performed for a time of from 0.5 hour to 24 hours, more preferably from 2 hours to 18 hours. For example, the heat treatment step may be performed for 0.5 hour or more, 1 hours or more, 3 hours or more, 6 hours or more, or 12 hours or more. The further step heat treating may be performed for 24 hours or less, 18 hours or less, 16 hours or less, or 12 hours or less. Reducing conditions include under an inert gas such as nitrogen, helium, argon; or under a mixture of an inert gas and hydrogen; or under vacuum. Preferably heating under reducing conditions comprises heating under inert gas.

In some methods it may be beneficial to perform a two-step heat treatment. For example, the precursor material mixture and/or the further precursor material mixture may be heated at a first temperature for a first length of time, follow by heating at a second temperature for a second length of time. Preferably the second temperature is higher than the first temperature. Performing such a two-step heat treatment may assist the solid-state reaction to form the desired crystal structure. This may be carried out in sequence, or may be carried out with an intermediate re-grinding step.

The method may include one or more post-processing steps after formation of the mixed niobium oxide. In some cases, the method may include a post-processing step of heat treating the mixed niobium oxide, sometimes referred to as 'annealing'. This post-processing heat treatment step may be performed in a different gaseous atmosphere to the step of heat treating the precursor material mixture to form the mixed niobium oxide. The post-processing heat treatment step may be performed in an inert or reducing gaseous atmosphere. Such a post-processing heat treatment step may be performed at temperatures of above 500° C., for example at about 900° C. Inclusion of a post-processing heat treatment step may be beneficial to e.g. form deficiencies or defects in the mixed niobium oxide, for example to induce oxygen deficiency; or to carry out anion exchange on the formed mixed niobium oxide e.g. N exchange for the O anion.

The method may include a step of milling and/or classifying the mixed niobium oxide (e.g. impact milling, jet milling, steam jet milling, high energy milling, high shear milling, pin milling, air classification, wheel classification, sieving) to provide a material with any of the particle size parameters given above.

There may be a step of carbon coating the mixed niobium oxide to improve its surface electrical conductivity, or to prevent reactions with electrolyte. This is typically comprised of combining the mixed niobium oxide with a carbon precursor to form an intermediate material that may comprise milling, preferably high energy milling. Alternatively or in addition, the step may comprise mixing the mixed niobium oxide with the carbon precursor in a solvent, such as water, ethanol or THF. These represent efficient methods of ensuring uniform mixing of the mixed niobium oxide with the carbon precursor.

It has been found that a carbon precursor comprising polyaromatic $sp^2$ carbon provides a particularly beneficial carbon coating on mixed niobium oxides of the first aspect of the invention. Therefore, the method of making a mixed niobium oxide may further comprise the steps of: combining the mixed niobium oxide or the mixed niobium oxide comprising element Q with a carbon precursor comprising polyaromatic $sp^2$ carbon to form an intermediate material; and heating the intermediate material under reducing conditions to pyrolyse the carbon precursor forming a carbon coating on the mixed niobium oxide and inducing oxygen vacancies in the mixed niobium oxide.

The intermediate material may comprise the carbon precursor in an amount of up to 25 wt %, or 0.1-15 wt %, or 0.2-8 wt %, based on the total weight of the mixed niobium oxide and the carbon precursor. The carbon coating on the mixed niobium oxide may be present in an amount of up to 10 wt %, or 0.05-5 wt %, or 0.1-3 wt %, based on the total weight of the mixed niobium oxide. These amounts of the carbon precursor and/or carbon coating provide a good balance between improving the electronic conductivity by the carbon coating without overly reducing the capacity of the mixed niobium oxide by overly reducing the proportion of the mixed niobium oxide. The mass of carbon precursor lost during pyrolysis may be in the range of 30-70 wt %.

The step of heating the intermediate material under reducing conditions may be performed at a temperature in the range of 400-1,200° C., or 500-1,100° C., or 600-900° C. The step of heating the intermediate material under reducing conditions may be performed for a duration within the range of 30 minutes to 12 hours, 1-9 hours, or 2-6 hours.

The step of heating the intermediate material under reducing conditions may be performed under an inert gas such as nitrogen, helium, argon; or may be performed under a mixture of an inert gas and hydrogen; or may be performed under vacuum.

The carbon precursor comprising polyaromatic $sp^2$ carbon may be selected from pitch carbons, graphene oxide, graphene, and mixtures thereof. Preferably, the carbon precursor comprising polyaromatic $sp^2$ carbon is selected from pitch carbons, graphene oxide, and mixtures thereof. Most preferably, the carbon precursor comprising polyaromatic $sp^2$ carbon is selected from pitch carbons. The pitch carbons may be selected from coal tar pitch, petroleum pitch, mesophase pitch, wood tar pitch, isotropic pitch, bitumen, and mixtures thereof.

Pitch carbon is a mixture of aromatic hydrocarbons of different molecular weights. Pitch carbon is a low cost by-product from petroleum refineries and is widely available. The use of pitch carbon is advantageous because pitch has a low content of oxygen. Therefore, in combination with heating the intermediate material under reducing conditions, the use of pitch favours the formation of oxygen vacancies in the mixed niobium oxide.

Other carbon precursors typically contain substantial amounts of oxygen. For example, carbohydrates such as glucose and sucrose are often used as carbon precursors. These have the empirical formula $C_m(H_2O)_n$ and thus contain a significant amount of covalently-bonded oxygen (e.g. sucrose has the formula $C_{12}H_{22}O_{11}$ and is about 42 wt % oxygen). The pyrolysis of carbon precursors which contain substantial amounts of oxygen is believed to prevent or inhibit reduction of a mixed niobium oxide, or even lead to oxidation, meaning that oxygen vacancies may not be induced in the mixed niobium oxide. Accordingly, the carbon precursor may have an oxygen content of less than 10 wt %, preferably less than 5 wt %.

The carbon precursor may be substantially free of $sp^3$ carbon. For example, the carbon precursor may comprise less than 10 wt % sources of $sp^3$ carbon, preferably less than 5 wt % sources of $sp^3$ carbon. Carbohydrates are sources of $sp^3$ carbon. The carbon precursor may be free of carbohydrates. It will be understood that some carbon precursors used in the invention may contain impurities of $sp^3$ carbon, for example up to 3 wt %.

The mixed niobium oxide of the first aspect of the invention may comprise a carbon coating. Preferably the carbon coating comprises polyaromatic $sp^2$ carbon. Such a coating is formed by pyrolysing a carbon precursor comprising polyaromatic $sp^2$ carbon, preferably under reducing conditions, since the $sp^2$ hybridisation is largely retained during pyrolysis. Typically, pyrolysis of a polyaromatic $sp^2$ carbon precursor under reducing conditions results in the domains of $sp^2$ aromatic carbon increasing in size. Accordingly, the presence of a carbon coating comprising polyaromatic $sp^2$ may be established via knowledge of the precursor used to make the coating. The carbon coating may be defined as a carbon coating formed from pyrolysis of a carbon precursor comprising polyaromatic sp² carbon. Preferably, the carbon coating is derived from pitch carbons.

The presence of a carbon coating comprising polyaromatic sp² carbon may also be established by routine spectroscopic techniques. For instance, Raman spectroscopy provides characteristic peaks (most observed in the region 1,000-3,500 cm$^{-1}$) which can be used to identify the presence of different forms of carbon. A highly crystalline sample of sp³ carbon (e.g. diamond) provides a narrow characteristic peak at ~1332 cm$^{-1}$. Polyaromatic sp² carbon typically provides characteristic D, G, and 2D peaks. The relative intensity of D and G peaks ($I_D/I_G$) can provide information on the relative proportion of sp² to sp³ carbon. The mixed niobium oxide may have an $I_D/I_G$ ratio as observed by Raman spectroscopy within the range of 0.85-1.15, or 0.90-1.10, or 0.95-1.05.

X-ray diffraction may also be used to provide information on the type of carbon coating. For example, an XRD pattern of a mixed niobium oxide with a carbon coating may be compared to an XRD pattern of the uncoated mixed niobium oxide and/or to an XRD pattern of a pyrolysed sample of the carbon precursor used to make the carbon coating.

The carbon coating may be semi-crystalline. For example, the carbon coating may provide a peak in an XRD pattern of the mixed niobium oxide centred at 2θ of about 26° with a width (full width at half maximum) of at least 0.20°, or at least 0.25°, or at least 0.30°.

at $T_1$=600-1350° C. for 0.5-24 h, providing the desired Wadsley-Roth phase. Selected samples (9-11) were removed from the furnace after heat treatment, ground by impact mill at 20,000 rpm, and then had repeated heat treatment under similar conditions. Specifically, the precursor mixture was heated at a ramp rate of 5°/min to temperatures at or below 800° C., followed by a ramp rate of 1°/min to the maximum temperature for a holding period. An additional heat treatment step was also applied in some cases under a $N_2$ atmosphere at $T_2$=600-1350° C. for 0.5-12 h. For inclusion of anions, there was an additional milling/mixing step with the precursor (PVDF in a 1:10 mass ratio for F; if N is required then $C_3H_6N_6$ in a 1:3 mass ratio versus the parent material may be used) prior to heat treatment in a $N_2$ or air atmosphere in one or two steps at $T_{2a}/T_{2b}$=300-1200° C. for 0.5-12 h.

A final de-agglomeration step was utilised by impact milling or jet milling to adjust to the desired particle size distribution where necessary. Specifically, the material was de-agglomerated by impact milling at 20,000 RPM for 10 seconds. Particle Size Distributions were obtained with a Horiba laser diffraction particle analyser for dry powder. Air pressure was kept at 0.3 MPa. The results are set out in Table 1.

TABLE 1

A summary of the materials synthesised. Particle size distribution has been evaluated by dry powder laser diffraction.

| Sample | Material | $T_1$ (° C.; h) | $T_{2a}$ (° C.; h) | $T_{2b}$ (° C.; h) | D10 (μm) | D50 (μm) | D90 (μm) |
|---|---|---|---|---|---|---|---|
| 1* | $Zn_2Nb_{34}O_{87}$ | 1200; 12 | — | — | 4.6 | 8.1 | 15.1 |
| 2** | $Zn_2Nb_{34}O_{87-x}$ | 1200; 12 | 1200†; 5 | — | 4.4 | 7.4 | 12.3 |
| 3 | $Ge_{0.1}Zn_{1.9}Nb_{34}O_{87.1}$*** | 1200; 12 | — | — | 5.1 | 9.2 | 16.5 |
| 4 | $Zn_2Nb_{34}O_{87-y}F_y$ | 1200; 12 | 1200; 5† | 375; 24 | 4.0 | 6.8 | 11.3 |
| 5 | $Cr_{0.4}Zn_{1.6}Ti_{0.4}Nb_{33.6}O_{87}$ | 1100; 12 | — | — | 3.4 | 5.4 | 8.3 |
| 6 | $Cr_{0.6}Zn_{1.4}Ti_{0.6}Nb_{33.4}O_{87}$ | 1100; 12 | — | — | 3.5 | 5.4 | 8.5 |
| 7 | $Cr_{0.8}Zn_{1.2}Ti_{0.8}Nb_{33.2}O_{87}$ | 1100; 12 | — | — | 3.4 | 5.5 | 8.5 |
| 8 | $Cr_{0.99}Zn_{1.01}Ti_{0.99}Nb_{33.01}O_{87}$ | 1100; 12 | — | — | 3.4 | 5.5 | 8.4 |
| 9 | $Cr_{0.4}Zn_{1.6}Zr_{0.4}Nb_{33.6}O_{87}$ | 1100; 12 x3 | — | — | 3.6 | 5.6 | 8.5 |
| 10 | $Zn_2Fe_{0.2}Nb_{33.8}O_{86.8}$*** | 1100; 12 x2 | — | — | 3.8 | 5.8 | 8.8 |
| 11 | $Al_{0.1}Zn_{1.9}Nb_{34}O_{87.05}$*** | 1100; 12 x2 | — | — | 4.0 | 6.1 | 9.2 |
| 12 | $Cr_{0.99}Cu_{1.01}Ti_{0.99}Nb_{33.01}O_{87}$ | 1100; 12 | — | — | 2.9 | 6.0 | 11.5 |

*Comparative sample-unmodified 'base' $Zn_2Nb_{34}O_{87}$
**Induced oxygen deficiency may be calculated from e.g. TGA
***Oxygen stoichiometry calculated assuming $Ge^{4+}$, $Zn^{2+}$, $Fe^{3+}$, $Al^{3+}$, and $Nb^{5+}$
†This heat treatment step was carried out in a $N_2$ atmosphere. All others were carried out in an air atmosphere.

EXAMPLES

The mixed niobium oxides were synthesised by a solid-state route. In a first step precursor materials ($Nb_2O_5$, $GeO_2$, $ZnO$, $TiO_2$, $Cr_2O_3$, $Al_2O_3$, $Fe_2O_3$, $ZrO_2$, and CuO) were milled to a $D_{50}$ (v/v) particle size below 20 μm. The materials were mixed in stoichiometric proportions (50 g total) and combined in a homogeneous powder mixture by an impact mill at 20,000 rpm. The resulting powders were heat treated in an alumina crucible in a muffle furnace in air Materials Characterisation The phase purity of samples was analysed using a Rigaku Miniflex powder X-ray diffractometer in 2θ range (10-70°) at 1°/min scan rate.

Figure 2:
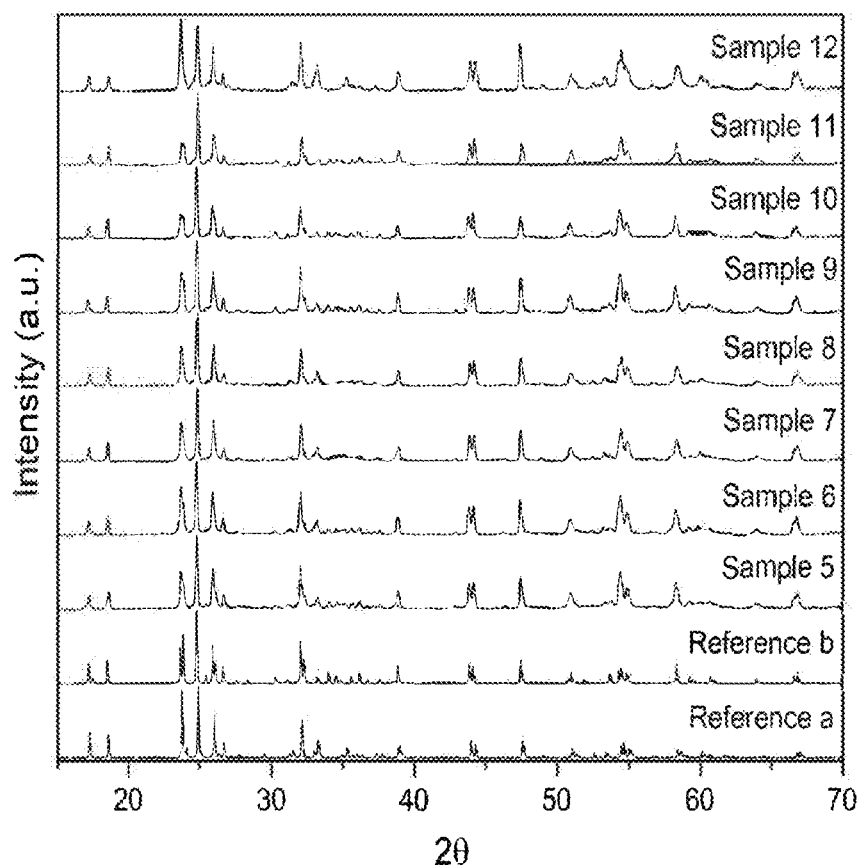
FIG. 2: Powder XRD of Samples 5-12.

FIG. 1 shows the measured XRD diffraction patterns for Samples 1-4, and FIG. 2 for Samples 5-12. Diffraction patterns have peaks at the same locations (with some shift due to crystal modification, up to around 0.2°), and match crystallography database entry JCPDS 28-1478. Certain samples were found to be a phase mixture of monoclinic (JCPDS 28-1478, Reference a) and orthorhombic (PDF card: 04-021-7859, Reference b) crystal structures of the same Wadsley-Roth block structure ($Zn_2Nb_{34}O_{87}$), and so have been refined to this mixture. There is no amorphous background noise and the peaks are sharp and intense. This means that all samples are crystalline, with crystallite size 45-55 nm according to the Scherrer equation and crystal structure matching $Zn_2Nb_{34}O_{87}$. This confirms the presence of a Wadsley-Roth crystal structure.

TABLE 2

A summary table of unit cell parameters for each sample calculated by Rietveld refinement of their powder XRD spectra with software GSASII, and average crystallite size calculated by the Scherrer equation across the spectra.

| Sample | a [Å] | b [Å] | c [Å] | β [°] | Vol [Å³] | $\chi^2$ | % Phase | Crystallite size [nm] |
|---|---|---|---|---|---|---|---|---|
| Reference a | 15.57 | 3.814 | 20.54 | 113.68 | 1117.02 | — | — | — |
| Reference b | 28.709 | 3.826 | 20.624 | 90 | 2265.15 | — | — | — |
| 1* | 15.533 | 3.807 | 20.560 | 113.09 | 1118.61 | 9 | 100 a | 48 |
| 2 | 15.537 | 3.806 | 20.563 | 113.16 | 1118.09 | 10 | 100 a | 49 |
| 3 | 15.560 | 3.823 | 20.649 | 113.16 | 1132.80 | 10 | 100 a | 48 |
| 4 | 15.542 | 3.808 | 20.562 | 113.15 | 1119.05 | 11 | 100 a | 51 |
| 5a | 15.594 | 3.829 | 20.643 | 113.02 | 1134.41 | 10 | 34 a | 48 |
| 5b | 28.710 | 3.827 | 20.650 | 90 | 2269.10 | | 66 b | |
| 6a | 15.594 | 3.828 | 20.635 | 113.04 | 1133.55 | 9 | 43 a | 50 |
| 6b | 28.703 | 3.827 | 20.645 | 90 | 2267.69 | | 57 b | |
| 7a | 15.587 | 3.828 | 20.621 | 113.05 | 1132.23 | 9 | 40 a | 50 |
| 7b | 28.693 | 3.827 | 20.635 | 90 | 2265.88 | | 60 b | |
| 8a | 15.584 | 3.828 | 20.612 | 113.07 | 1131.35 | 9 | 41 a | 52 |
| 8b | 28.687 | 3.827 | 20.628 | 90 | 2264.52 | | 59 b | |
| 9a | 15.606 | 3.830 | 20.650 | 113.07 | 1135.47 | 10 | 25 a | 48 |
| 9b | 28.725 | 3.828 | 20.658 | 90 | 2271.51 | | 75 b | |
| 10a | 15.608 | 3.830 | 20.655 | 113.10 | 1135.74 | 10 | 12 a | 48 |
| 10b | 28.726 | 3.828 | 20.664 | 90 | 2272.61 | | 88 b | |
| 11a | 15.608 | 3.827 | 20.648 | 113.11 | 1134.28 | 11 | 12 a | 48 |
| 11b | 28.722 | 3.829 | 20.667 | 90 | 2272.87 | | 88 b | |
| 12 | 15.566 | 3.831 | 20.610 | 113.12 | 1130.41 | 12 | 100 a | 49 |

$\chi^2$ represents the goodness of fit and the accuracy of the Rietveld refinement.

Electrochemical Characterisation

Li-ion cell charge rate is usually expressed as a "C-rate". A 1 C charge rate means a charge current such that the cell is fully charged in 1 h, 10 C charge means that the battery is fully charged in 1/10th of an hour (6 minutes). C-rate hereon is defined from the reversible capacity observed of the anode within the voltage limits applied in its second cycle de-lithiation, i.e. for an anode that exhibits 1.0 mAh $cm^{-2}$ capacity within the voltage limits of 1.1-3.0 V, a 1 C rate corresponds to a current density applied of 1.0 mA $cm^{-2}$. In a typical MNO material as described herein, this corresponds to ~200 mA/g of active material.

Electrochemical tests were carried out in half-coin cells (CR2032 size) for analysis. In half-coin tests, the active material is tested in an electrode versus a Li metal electrode to assess its fundamental performance. In the below examples, the active material composition to be tested was combined with N-Methyl Pyrrolidone (NMP), carbon black (Super P) acting as a conductive additive, and poly(vinyldifluoride) (PVDF) binder and mixed to form a slurry using a lab-scale centrifugal planetary mixer. The non-NMP composition of the slurries was 92 wt % active material, 3 wt % conductive additive, 5 wt % binder. The slurry was coated on an Al foil current collector to the desired loading of 69-75 g $m^{-2}$ by doctor blade coating and dried by heating. The electrodes were then calendared to a density of 2.6-2.9 g $cm^{-3}$ at 80° C. to achieve targeted porosities of 35-40%. Electrodes were punched out at the desired size and combined with a separator (Celgard porous PP/PE), Li metal, and electrolyte (1.3 M $LiPF_6$ in EC/DEC) inside a steel coin cell casing and sealed under pressure. Cycling was then carried out at 23° C. at low current rates (C/10) for 2 full cycles of lithiation and de-lithiation between 1.1-3.0 V. Afterwards, the cells were tested for their performance at increasing current densities. During these tests, the cells were cycled asymmetric at 23° C., with a slow lithiation (C/5) followed by increasing de-lithiation rates (e.g. 1 C, 5 C, 10 C) to provide the capacity retention, and nominal voltage at 5 C. Nominal voltage vs Li/Li+ has been calculated from the integral of the V/Q curve divided by the total capacity at 5 C during de-lithiation. No constant voltage steps were used. Data has been averaged from 5 cells prepared from the same electrode coating, with the error shown from the standard deviation. Accordingly, the data represent a robust study showing the improvements achieved by the materials according to the invention compared to prior materials. These data are shown in Tables 4 and 5.

Cell resistance has been calculated from the Direct Current Internal Resistance (DCIR) of the half coin cell. In a typical measurement, the cell is lithiated to 100% State of Charge (SOC) and then delithiated to 50% SOC at a rate of C/10, then after a rest of 0.5 h a 5 C delithiation pulse is applied for 10 s, followed by another rest of 0.5 h. The DCIR is then calculated from V=IR, using the voltage immediately before the peak from the pulse, and the measured maximum voltage during the pulse.

The electrical resistivity of the electrode coating was separately assessed by a 4-point-probe method with an Ossila instrument (T2001A3-UK) at 23° C. Slurries were formulated (the active material composition to be tested was combined with N-Methyl Pyrrolidone (NMP), carbon black acting as a conductive additive, and poly(vinyldifluoride) (PVDF) binder and mixed to form a slurry using a lab-scale centrifugal planetary mixer; the non-NMP composition of the slurries was 80 w. % active material, 10 w. % conductive additive, 10 w. % binder). The slurry was then coated on a dielectric mylar film at a loading of 1 mg/cm². Electrode-sized discs where then punched out and resistance of the coated-film was measured using a 4-point probe. The results for sheet resistance (Ω/square) are outlined in Table 3, with error based on the standard deviation of 3 measurements.

Homogeneous, smooth coatings on both Cu and Al current collector foils, the coatings being free of visible defects or aggregates may also be prepared as above for these samples with a centrifugal planetary mixer to a composition of up to 94 wt % active material, 4 wt % conductive additive, 2 wt % binder. These can be prepared with both PVDF (i.e. NMP-based) and CMC:SBR-based (i.e. water-based) binder systems. The coatings can be calendared at 80° C. for PVDF and 50° C. for CMC:SBR to porosities of 35-40% at loadings from 1.0 to 5.0 mAh cm$^{-2}$. This is important to demonstrate the viability of these materials in both high energy and high-power applications, with high active material content.

TABLE 3

Summary of 4-point probe resistivity measurement results

| Sample | Sheet Resistivity [Ω/square] |
|---|---|
| 1* | 1242 ± 156 |
| 2 | 1027 ± 13 |
| 3 | 1041 ± 103 |

TABLE 4

A summary of electrochemical testing results from Li-ion half coin cells. In general it is beneficial to have a higher capacity, a higher Coulombic efficiency, and a lower nominal voltage.

| Sample | Delithiation specific capacity 2$^{nd}$ C/10 cycle [mAh/g] | Coulombic efficiency 1$^{st}$ cycle at C/10 [%] | Nominal de-lithiation voltage at 5C vs Li/Li$^+$ [V] |
|---|---|---|---|
| 1* | 196 ± 1 | 97.84 ± 0.02 | 1.836 ± 0.008 |
| 2 | 197 ± 1 | 98.18 ± 0.54 | 1.816 ± 0.010 |
| 3 | 201 ± 1 | 98.08 ± 0.09 | 1.776 ± 0.013 |
| 4 | 200 ± 4 | 97.76 ± 0.15 | 1.859 ± 0.028 |
| 5 | 206 ± 1 | 99.09 ± 0.64 | 1.820 ± 0.007 |
| 6 | 208 ± 3 | 98.69 ± 0.11 | 1.821 ± 0.002 |
| 7 | 213 ± 2 | 98.82 ± 0.31 | 1.799 ± 0.001 |
| 8 | 212 ± 2 | 98.87 ± 0.27 | 1.795 ± 0.003 |
| 9 | 202 ± 1 | 98.46 ± 0.15 | 1.787 ± 0.001 |
| 10 | 201 ± 3 | 98.27 ± 0.32 | 1.818 ± 0.004 |
| 11 | 205 ± 1 | 98.51 ± 0.51 | 1.813 ± 0.004 |
| 12 | 208 ± 1 | 93.20 ± 0.07 | 1.827 ± 0.002 |

*Comparative sample

TABLE 5

A summary of further electrochemical testing results from Li-ion half coin cells.

| Sample | Delithiation specific capacity 1C [mAh/g] | Delithiation specific capacity 5C [mAh/g] | Delithiation specific capacity 10C [mAh/g] |
|---|---|---|---|
| 1* | 190 ± 2 | 186 ± 2 | 180 ± 4 |
| 2 | 192 ± 2 | 191 +2 | 184 ± 3 |
| 3 | 195 # 1 | 192 ± 1 | 184 ± 2 |
| 4 | 194 ± 4 | 191 ± 4 | 180 ± 7 |
| 5 | 202 ± 2 | 200 ± 2 | 192 ± 1 |
| 6 | 202 ± 2 | 198 ± 2 | 191 ± 2 |
| 7 | 205 ± 4 | 203 ± 3 | 194 ± 2 |
| 8 | 206 ± 1 | 202 ± 1 | 197 ± 1 |
| 9 | 197 ± 2 | 194 ± 2 | 190 ± 2 |
| 10 | 193 ± 2 | 191 +2 | 188 ± 2 |
| 11 | 198 ± 3 | 196 ± 3 | 192 ± 3 |
| 12 | 203 ± 1 | 202 ± 1 | 195 ± 1 |

*Comparative sample

TABLE 6

A summary of further electrochemical testing results from Li-ion half coin cells

| Sample | De-lithiation capacity retention 1C/0.5C [%] | De-lithiation capacity retention 5C/0.5C [%] | De-lithiation capacity retention 10C/0.5C [%] | Cell resistance [mOhms] |
|---|---|---|---|---|
| 1* | 99.6 ± 0.3 | 97.5 ± 0.6 | 94.1 ± 2.1 | 21.7 ± 0.8 |
| 2 | 99.6 ± 0.1 | 98.7 ± 0.2 | 95.3 ± 1.3 | 18.8 ± 0.7 |
| 3 | 99.9 ± 0.1 | 98.2 ± 0.3 | 94.1 ± 1.0 | 18.4 ± 1.1 |
| 4 | 99.6 ± 0.1 | 98.3 ± 0.9 | 92.5 ± 2.5 | 23.2 ± 5.7 |
| 5 | 99.9 ± 0.1 | 98.7 ± 0.1 | 94.9 ± 0.5 | 18.0 ± 1.0 |
| 6 | 99.5 ± 0.1 | 97.7 ± 0.3 | 94.4 ± 0.7 | 19.6+ 1.1 |
| 7 | 99.7 ± 0.1 | 98.6 ± 0.3 | 94.2 ± 1.0 | 17.0 ± 0.6 |
| 8 | 99.6 ± 0.1 | 98.5 ± 0.1 | 96.0 ± 0.6 | 18.8 ± 1.1 |
| 9 | 99.6 ± 0.2 | 98.0 ± 0.4 | 95.9 ± 0.3 | 19.6 ± 0.4 |
| 10 | 99.7 ± 0.1 | 98.7 ± 0.4 | 96.7 ± 0.5 | 21.5 ± 1.4 |
| 11 | 99.6 ± 0.1 | 98.4 ± 0.4 | 96.5 ± 0.5 | 20.1 ± 1.6 |
| 12 | 99.9 ± 0.1 | 99.5 ± 0.1 | 96.2 ± 0.5 | 20.6 ± 0.8 |

*Comparative sample

Discussion

The mixed niobium oxide Sample 1* has been modified through a cation substitution approach in Sample 3, focussed at the Zn$^{2+}$ cations substituted by Ge$^{4+}$. In Samples 5-8, Zn$^{2+}$ cations have been substituted by Cr$^{3+}$ cations and Nb$^{5+}$ cations have been substituted by Ti$^{4+}$ cations, spanning a wide range of the variables a and b. Sample 10 substitutes Nb$^{5+}$ by Fe$^{3+}$. Sample 11 substitutes Zn$^{2+}$ by Al$^{3+}$. Sample 12 is based on Cu$_2$Nb$_{34}$O$_{87}$ where Cu$^{2+}$ cations have been substituted by Cr$^{3+}$ cations and Nb$^{5+}$ cations have been substituted by Ti$^{4+}$ cations. Increased valency may be compensated for by partial oxygen excess (i.e. c<0) and/or partial reduction of Nb$^{5+}$. Decreased vacancy may be compensated for by the formation of oxygen vacancies (i.e. c>0). These modifications are expected to provide an advantage versus the base crystal structure of Sample 1* through the combination of (a) altered ionic radii, (b) altered valency, and (c) altered voltage. Altered ionic radii can give rise to beneficial changes in electrochemical performance due to changing unit cell size and local distortions in crystal structure altering available lithiation sites or lithiation pathways—potentially improving Coulombic efficiency, capacity, performance at high rate, and lifetime. Altered valency provides significantly improved electrical conductivity of the material due to providing available intermediate energy levels for charge carriers. These effects are shown by the lower resistivity observed in Table 3 of the modified samples vs. Sample 1*, and by the improvements in specific capacity, coulombic efficiency, de-lithiation voltage at 5 C, and capacity retention at 1 C, 5 C, and 10 C observed in Tables 4-6. These are key results demonstrating the utility of the modified mixed niobium oxides according to the invention for use in high-power Li-ion cells designed for fast charge/discharge.

Table 2 demonstrates the alterations in unit cell parameters observed upon cation exchange, observed due to alterations of ionic radii and electronic structure of these materials.

It is expected that similar benefits will be observed with the described cation exchange approach for this material for use in Li-ion cells.

The mixed niobium oxide Sample 1* has modified through the introduction of induced oxygen deficiency by a heat treatment in an inert or reducing atmosphere to provide Sample 2. By treating the 'base' oxide at high temperature in an inert or reducing atmosphere it may be partially reduced, and maintain this upon return to room temperature and exposure to an air atmosphere. This is accompanied with an obvious colour change, for example Sample 2 is grey/black in colour vs white for Sample 1*. This colour change demonstrates a significant change in the electronic structure of the material, allowing it to interact with different energies (i.e. wavelength) of visible light due to the reduced band gap. This is reflected in sample 2, demonstrating an improved delithiation voltage at a rate of 5 C, which corresponds to a reduced level of polarisation in the cell.

The induced oxygen deficiency results in a defect in the crystal structure, e.g. where an oxygen anion has been removed, and the overall redox state of the cations is reduced in turn. This provides additional energetic states improving material electrical conductivity significantly, and alters the band gap energy as demonstrated by colour changes. This is shown by the lower resistivity observed in Table 3 for Sample 2 vs. Sample 1*. If induced oxygen deficiency is present beyond 5 atomic % (i.e. c>4.35), then the crystal structure may be less stable.

The mixed niobium oxide Sample 1* has modified through anion substitution ($O^{2-}$ by $F^-$) to provide Sample 4. Improvements in specific capacity were observed (Tables 4 and 5).

It is expected that similar benefits will be observed in any of the described mixed niobium oxides utilising any combination of M1, M2, M3, Q, a, b, c, and d within the described limits for use in Li ion cells.

Mixtures with LTO

A modified mixed niobium oxide was tested as an active electrode material in combination with a commercial material, demonstrating the utility of the modified mixed niobium oxides for incorporation into and improvement of existing battery technologies.

Commercial-grade LTO ($Li_4Ti_5O_{12}$) was purchased from Targray Technology International Inc with properties outlined in Table E1 (Sample E1). The Wadsley-Roth material was synthesised in-house by a solid-state route. In a first step precursor materials ($Nb_2O_5$, $Cr_2O_3$, ZnO, and $TiO_2$) were mixed in stoichiometric proportions (200 g total) and ball-milled at 550 rpm with a ball to powder ratio of 10:1 for 3 h. The resulting powder was heat treated in an alumina crucible in a muffle furnace in air at $T_1$=1100° C. for 12 h, providing the desired Wadsley-Roth phase.

Active electrode material mixtures of MNO and LTO were obtained by low to high energy powder mixing/blending techniques, such as by rotational mixing in multiple directions, rotational V-type blending over a single axis, planetary mixing, centrifugal planetary mixing, high shear mixing, and other typical mixing/blending techniques. In this case, mixing was achieved with a centrifugal planetary mixer on 5 g batches of materials, mixed at 2000 rpm for 3 mins, 10 times.

TABLE E1

A summary of the materials utilised. Particle size distribution has been evaluated by drypowder laser diffraction, and surface area by the BET method using $N_2$.

| Sample | Material | D10 (μm) | D50 (μm) | D90 (μm) | BET Surface Area [$m^2 g^{-1}$] |
|---|---|---|---|---|---|
| E1 | LTO (from commercial supplier) | 0.8 | 2.5 | 5.0 | 16.0* |
| E2 | $Cr_{0.4}Zn_{1.6}Ti_{0.4}Nb_{33.6}O_{87}$ | 3.3 | 5.3 | 8.3 | 0.6 |

*From manufacturer specification sheet.

Materials Characterisation

The phase purity of samples was analysed using a Rigaku Miniflex powder X-ray diffractometer in 2θ range (20-70°) at 1°/min scan rate. The diffraction pattern for Sample E1 matches JCPDS crystallography database entry JCPDS 49-0207, which corresponds to the spinel crystal structure of $Li_4Ti_5O_{12}$. There is no amorphous background noise and the peaks are sharp and intense. This means that the sample is crystalline, with crystallite size 43±7 nm according to the Scherrer equation. The diffraction pattern for Sample E2 confirms the presence of the desired Wadsley-Roth crystal structure $Zn_2Nb_{34}O_{87}$. There is no amorphous background noise and the peaks are sharp and intense. This means that the sample is phase-pure and crystalline, with crystallite size 49±6 nm according to the Scherrer equation.

Particle Size Distributions were obtained with a Horiba laser diffraction particle analyser for dry powder. Air pressure was kept at 0.3 MPa. The results are set out in Table E1. BET surface area analysis was carried out with $N_2$ on a BELSORP-miniX instrument at 77.35 K and are set out in Table E1.

Electrochemical Characterisation

Electrochemical tests were carried out in half-coin cells (CR2032 size) for analysis. There are some differences to the testing methodology used for Samples 1-12 above, meaning that the results may not be directly comparable. In half-coin tests, the active material is tested in an electrode versus a Li metal electrode to assess its fundamental performance. In the below examples, the active material composition to be tested was combined with N-Methyl Pyrrolidone (NMP), carbon black acting as a conductive additive, and poly(vinyldifluoride) (PVDF) binder and mixed to form a slurry using a lab-scale centrifugal planetary mixer. The non-NMP composition of the slurries was 90 wt % active material, 6 wt % conductive additive, 4 wt % binder. The slurry was coated on an Al foil current collector to the desired loading of 5.7-6.5 mg $cm^{-2}$ by doctor blade coating and dried. The electrodes were then calendared to a density of 2.00-3.75 g $cm^{-3}$ (dependent on material density) at 80° C. to achieve targeted porosity of 35-40%. Porosity was calculated as the measured electrode density divided by the weighted average density of each component of the composite electrode coating film. Electrodes were punched out at the desired size and combined with a separator (Celgard porous PP/PE), Li metal, and electrolyte (1.3 M $LiPF_6$ in EC/DEC) inside a steel coin cell casing and sealed under pressure. Cycling was then carried out at low current rates (C/10) for 2 full cycles of lithiation and de-lithiation between 1.1-3.0 V. Afterwards, the cells were tested for their performance at increasing current densities. During rate tests, the cells were cycled asymmetric, with a slow lithiation (C/5, with a CV step at 1.1V to C/20 current density) followed by increasing de-lithiation rates for de-lithation rate tests. All electrochemical tests were carried out in a thermally controlled environment at 23° C.

The first cycle efficiency was calculated as the fraction of de-lithiation capacity/lithiation capacity in the first cycle at C/10. The nominal voltage at each C-rate was determined by integrating the voltage-capacity curves and then by dividing it by the total capacity.

To quantify the significance of the differences in data observed, an error calculation was carried out and applied to the values for specific capacity. The error for these was approximated as the largest error possible with the microbalance used (±0.1 mg), and the lowest loading electrode (5.7 mg $cm^2$) on a 14 mm electrode disc. This provides an error of t 1.1%, which has been applied to each capacity measurement. Error in Coulombic efficiency, capacity retention, and voltage were assumed to be negligible for the cell tested as the instrument accuracy far exceeds the stated significant figures, and the values are independent of the balance errors.

TABLE E2

A summary of the electrochemical tests undertaken with Samples E1 and E2. Achieved electrode conditions are also referenced for each test. providing smooth electrodes free of agglomerates, that demonstrate good adhesion and cohesion to the current collector.

| Test Ref. | A* | B | C |
|---|---|---|---|
| Content of Sample E1 [w/w%] | 100 | — | 50 |
| Content of Sample E2 [w/w%] | — | 100 | 50 |
| Electrode loading [mg cm$^{-2}$] | 6.3 | 6.3 | 6.3 |

TABLE E3

A summary of electrochemical testing results from Li-ion half coin cells.

| Test | De-lithiation specific capacity C/10 [mAh/g] | Initial coulombic efficiency [%] |
|---|---|---|
| A* | 161 ± 2 | 96.86 |
| B | 213 ± 2 | 98.30 |
| C | 185 ± 2 | 97.63 |

TABLE E4

A summary of electrochemical testing results at increasing current densities from Li-ion halfcoin cells.

| Test | 1C/0.5C de-lithiation capacity retention [%] | 2C/0.5C de-lithiation capacity retention [%] | 5C/0.5C de-lithiation capacity retention [%] | 10C/0.5C de-lithiation capacity retention [%] |
|---|---|---|---|---|
| A* | 99.4 | 98.8 | 97.5 | 96.3 |
| B | 99.1 | 98.6 | 97.2 | 89.8 |
| C | 100.0 | 98.9 | 97.4 | 93.1 |

TABLE E5

A summary of the nominal de-lithiation voltage at each C-rate.

| | Nominal De-lithiation Voltage vs Li/Li$^+$ [V] | | | | |
|---|---|---|---|---|---|
| Test | 0.1C | 0.5C | 2C | 5C | 10C |
| A* | 1.57 | 1.59 | 1.61 | 1.67 | 1.78 |
| B | 1.58 | 1.60 | 1.69 | 1.84 | 2.09 |
| C | 1.58 | 1.60 | 1.68 | 1.81 | 2.03 |

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. For the avoidance of any doubt, any theoretical explanations provided herein are provided for the purposes of improving the understanding ofa reader. The inventors do not wish to be bound by any of these theoretical explanations. Any section headings used herein are for organizational purposes only and are not to be construed as limiting the subject matter described.

The invention claimed is:

1. An active electrode material comprising a mixed niobium oxide, wherein the mixed niobium oxide has the composition $M1_aM2_{2-a}M3_bNb_{34-b}O_{87-c-d}Q_d$, wherein: M1 and M2 are different;
   M1 is selected from Mg, Ca, Sr, Y, La, Ce, Zr, Hf, V, Nb, Ta, Cr, Mo, W, Mn, Fe, Co, Ni, Cu, Zn, Cd, B, Al, Ga, In, Si, Ge, Sn, Pb, P, Sb, Bi and mixtures thereof;
   M2 is Zn or Cu;
   M3 is selected from Mg, Ca, Sr, Y, La, Ce, Ti, Zr, Hf, V, Ta, Cr, Mo, W, Mn, Fe, Co, Ni, Cu, Zn, Cd, B, Al, Ga, In, Si, Ge, Sn, Pb, P, Sb, Bi, and mixtures thereof;
   Q is selected from F, Cl, Br, I, N, S, Se, and mixtures thereof;
   $0 \leq a < 1.0$; $\leq 0b \leq 3.4$; $-0.5 \leq c \leq 4.35$; $0 \leq d \leq 4.35$;
   one or more of a, b, c, and d does not equal 0; and
   when a, b, and d equal zero, c is greater than zero;
   wherein a crystal structure of the mixed niobium oxide as determined by X-ray diffraction corresponds to the crystal structure of one or more of $Zn_2Nb_{34}O_{87}$ and $Cu_2Nb_{34}O_{87}$.

2. The active electrode material of claim 1, wherein
   (i) a>0; and/or
   (ii) $0 \leq a \leq 0.6$; and/or
   (iii) $0 \leq a \leq 0.2$.

3. The active electrode material of claim 1, wherein
   (i) b>0; and/or
   (ii) $0 \leq b \leq 1.5$; and/or
   (iii) $0 \leq b \leq 0.3$; or
   (iv) b=0.

4. The active electrode material of claim 1, wherein
   (i) c≠0; or
   (ii) $0 \leq c \leq 4.35$; or
   (iii) $0 < c \leq 4.35$.

5. The active electrode material of claim 1, wherein
   (i) d>0; and/or
   (ii) $0 \leq d \leq 3.0$; and/or
   (iii) $0 \leq d \leq 2.17$; or
   (iv) d=0.

6. The active electrode material of claim 1, wherein at least one of a and b is >0, or when both a and b are >0.

7. The active electrode material of claim 1, wherein M1 is selected from
   (i) Mg, Zr, Hf, V, Nb, Ta, Cr, Mo, W, Mn, Fe, Co, Ni, Cu, Zn, Cd, B, Al, Ga, Si, Ge, Sn, P, and mixtures thereof; or
   (ii) Mg, Zr, V, Nb, Cr, Mo, W, Mn, Fe, Co, Ni, Cu, Zn, B, Al, Si, Ge, P, and mixtures thereof; or
   (iii) Mg, Zr, V, Cr, Mo, W, Fe, Cu, Zn, Al, Ge, P, and mixtures thereof.

8. The active electrode material of claim 1, wherein M2 is Zn.

9. The active electrode material of claim 1, wherein M3 is selected from
   (i) Mg, Ti, Zr, Hf, V, Ta, Cr, Mo, W, Mn, Fe, Co, Ni, Cu, Zn, Cd, B, Al, Ga, Si, Sn, P, and mixtures thereof; or
   (ii) Mg, Ti, Zr, V, Cr, Mo, W, Mn, Fe, Co, Ni, Cu, Zn, Cd, B, Al, Si, P, and mixtures thereof; or
   (iii) Ti, Zr, V, Cr, Mo, W, Fe, Cu, Zn, Al, P, and mixtures thereof.

10. The active electrode material of claim 1, wherein
    (i) M1 has an equal or higher valency than 2; or
    (ii) M3 has a lower valency than 5+; or
    (iii) M1 has an equal or higher valency than 2+ and M3 has a lower valency than 5+.

11. The active electrode material of claim 1, wherein M1 does not comprise Nb and wherein M3 does not comprise Zn and/or Cu.

12. The active electrode material of claim 1, wherein
(i) Q is selected from F, Cl, N, S, and mixtures thereof; or
(ii) Q is selected from F, N, and mixtures thereof; or
(iii) wherein Q is F.

13. The active electrode material according to claim 1, wherein:
M1 is selected from Cr, Al, Ge, and mixtures thereof;
M3 is selected from Ti, Zr, Fe, and mixtures thereof;
$0<a<1.0$;
$0<b\leq 1.5$;
$-0.5\leq c\leq 4.35$; or
$d=0$.

14. The active electrode material according to claim 1, wherein:
M1 is Cr;
M2 is Zn;
M3 is selected from Ti, Zr, and mixtures thereof;
$0.01<a<1.0$;
$0.01<b<1.0$;
$-0.5\leq c\leq 2$; and/or
$d=0$.

15. The active electrode material according to claim 1, wherein the mixed niobium oxide is oxygen deficient.

16. The active electrode material according to claim 1, wherein the mixed niobium oxide is coated with carbon.

17. The active electrode material according to claim 1, wherein the mixed niobium oxide is in particulate form, wherein the mixed niobium oxide has a $D_{50}$ particle diameter in the range of 0.1-100 μm.

18. The active electrode material according to claim 1, wherein the mixed niobium oxide has a BET surface area in the range of 0.1-100 $m^2/g$.

19. The active electrode material according to claim 1, wherein the mixed niobium oxide further comprises Li and/or Na intercalated within the crystal structure of the mixed niobium oxide.

20. The active electrode material according to claim 1 comprising the mixed niobium oxide and at least one other component; wherein the at least one other component is selected from a binder, a solvent, a conductive additive, a different active electrode material, and mixtures thereof.

21. An electrochemical device comprising an anode, a cathode, and an electrolyte disposed between the anode and the cathode, wherein the anode comprises the active electrode material according to claim 1.

22. An electrochemical device according to claim 21, wherein the electrochemical device is a lithium-ion battery having a reversible anode active material specific capacity of greater than 190 mAh/g at 20 mA/g, wherein the battery can be charged and discharged at current densities relative to the anode active material of 200 mA/g or more whilst retaining greater than 70% of the initial cell capacity at 20 mA/g.

23. A method of making a mixed niobium oxide, the method comprising steps of:
providing one or more precursor materials;
mixing said precursor materials to form a precursor material mixture; and
heat treating the precursor material mixture in a temperature range from 400° C.-1350° C., thereby providing the mixed niobium oxide;
wherein the mixed niobium oxide has the composition $M1_aM2_{2-a}M3_bNb_{34-b}O_{87-c-d}O_d$, wherein:
M1 and M2 are different;
M1 is selected from Mg, Ca, Sr, Y, La, Ce, Zr, Hf, V, Nb, Ta, Cr, Mo, W, Mn, Fe, Co, Ni, Cu, Zn, Cd, B, Al, Ga, In, Si, Ge, Sn, Pb, P, Sb, Bi and mixtures thereof;
M2 is Zn or Cu;
M3 is selected from Mg, Ca, Sr, Y, La, Ce, Ti, Zr, Hf, V, Ta, Cr, Mo, W, Mn, Fe, Co, Ni, Cu, Zn, Cd, B, Al, Ga, In, Si, Ge, Sn, Pb, P, Sb, Bi, and mixtures thereof;
Q is selected from F, Cl, Br, I, N, S, Se, and mixtures thereof;
$0\leq a<1.0; 0\leq b\leq 3.4; -0.5\leq c\leq 4.35; 0\leq d\leq 4.35$;
one or more of a, b, c, and d does not equal 0; and
when a, b, and d equal zero, c is greater than zero;
wherein a crystal structure of the mixed niobium oxide as determined by X-ray diffraction corresponds to the crystal structure of one or more of $Zn_2Nb_{34}O_{87}$ and $Cu_2Nb_{34}O_{87}$.

24. An active electrode material of claim 1, wherein the mixed niobium oxide is in particulate form and has a D10 particle diameter of at least 0.05 μm and a D90 particle diameter of no more than 200 μm.

* * * * *